United States Patent
Sheen et al.

(10) Patent No.: US 12,026,907 B2
(45) Date of Patent: Jul. 2, 2024

(54) IMAGING SYSTEMS AND RELATED METHODS INCLUDING RADAR IMAGING WITH MOVING ARRAYS OR MOVING TARGETS

(71) Applicant: Battelle Memorial Institute, Richland, WA (US)

(72) Inventors: David M. Sheen, Richland, WA (US); Richard Trevor Clark, Richland, WA (US); Jonathan R. Tedeschi, Richland, WA (US); A. Mark Jones, West Richland, WA (US); Thomas E. Hall, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 207 days.

(21) Appl. No.: 16/837,763

(22) Filed: Apr. 1, 2020

(65) Prior Publication Data
US 2020/0319331 A1    Oct. 8, 2020

Related U.S. Application Data

(60) Provisional application No. 62/829,531, filed on Apr. 4, 2019.

(51) Int. Cl.
*G06T 7/70*    (2017.01)
*G01S 7/295*    (2006.01)
(Continued)

(52) U.S. Cl.
CPC .............. *G06T 7/70* (2017.01); *G01S 7/2955* (2013.01); *G01S 7/352* (2013.01); *G01S 7/354* (2013.01);
(Continued)

(58) Field of Classification Search
CPC . G06T 7/70; G06T 7/292; G06T 2207/10044; G06T 2207/30208;
(Continued)

(56) References Cited

U.S. PATENT DOCUMENTS

| 4,471,357 A | 9/1984 | Wu et al. |
| 4,503,433 A | 3/1985 | Tomasi |

(Continued)

FOREIGN PATENT DOCUMENTS

| EP | 3869226 A1 * | 8/2021 | ............. G01S 13/86 |
| WO | WO-2009137528 A1 * | 11/2009 | ........... G01S 13/887 |

(Continued)

OTHER PUBLICATIONS

Hantscher et al., "Security Pre-Screening of Moving Persons Using a Rotating Multichannel W-Band Radar", IEEE Transactions on Microwave Theory and Techniques vol. 60, No. 3, Mar. 2012, pp. 870-880.

(Continued)

*Primary Examiner* — Nuzhat Pervin
(74) *Attorney, Agent, or Firm* — Wells St. John P.S.

(57) ABSTRACT

Imaging systems, including radio frequency, microwave and millimeter-wave arrangements, and related methods are described. According to one aspect, an imaging system includes an antenna array, a position capture system configured to generate position information indicative of locations of one of the antenna array and the target at the first and second moments in time, and wherein the one of the antenna array and the target move between the first and second moments in time, a transceiver configured to control the antenna array to emit electromagnetic energy towards the target and to generate an output that is indicative of the received electromagnetic energy, a data acquisition system configured to generate radar data, processing circuitry con- (Continued)

figured to process the position information and the radar data to generate image data regarding the target, and an interface configured to use the image data to generate visual images regarding the target.

23 Claims, 16 Drawing Sheets

(51) Int. Cl.
| | |
|---|---|
| *G01S 7/35* | (2006.01) |
| *G01S 13/34* | (2006.01) |
| *G01S 13/42* | (2006.01) |
| *G01S 13/89* | (2006.01) |
| *G01S 13/90* | (2006.01) |
| *G06F 3/04815* | (2022.01) |
| *G06T 7/292* | (2017.01) |
| *H04N 23/90* | (2023.01) |

(52) U.S. Cl.
CPC ............ *G01S 13/34* (2013.01); *G01S 13/426* (2013.01); *G01S 13/89* (2013.01); *G01S 13/90* (2013.01); *G06F 3/04815* (2013.01); *G06T 7/292* (2017.01); *H04N 23/90* (2023.01); *G01S 7/356* (2021.05); *G06T 2207/10044* (2013.01); *G06T 2207/30208* (2013.01)

(58) Field of Classification Search
CPC ........ G01S 7/2955; G01S 7/352; G01S 7/354; G01S 13/34; G01S 13/426; G01S 13/89; G01S 13/90; G01S 7/356; G06F 3/04815; H04N 5/247
USPC ........................................................ 342/25 A
See application file for complete search history.

(56) References Cited

U.S. PATENT DOCUMENTS

| | | | |
|---|---|---|---|
| 4,561,019 A | 12/1985 | Lizzi et al. | |
| 4,723,124 A | 2/1988 | Boles | |
| 4,924,229 A | 5/1990 | Eichel et al. | |
| 5,051,751 A | 9/1991 | Gray | |
| 5,334,980 A | 8/1994 | Decker | |
| 5,557,283 A | 9/1996 | Sheen et al. | |
| 6,664,914 B2 | 12/2003 | Longstaff et al. | |
| 6,965,340 B1 | 11/2005 | Baharav et al. | |
| 6,975,263 B1* | 12/2005 | Lovsen ............... H01Q 21/065 |
| | | | 342/72 |
| 7,034,746 B1 | 4/2006 | McMakin et al. | |
| 7,088,300 B2 | 8/2006 | Fisher | |
| 7,209,221 B2* | 4/2007 | Breed .................... B60R 22/26 |
| | | | 356/28 |
| 7,253,766 B2 | 8/2007 | Foote et al. | |
| 7,295,146 B2 | 11/2007 | McMakin et al. | |
| 7,405,692 B2 | 7/2008 | McMakin et al. | |
| 7,800,527 B2* | 9/2010 | Douglass ............... G01S 13/66 |
| | | | 342/52 |
| 7,844,081 B2* | 11/2010 | McMakin ............. G01S 13/887 |
| | | | 382/115 |
| 7,852,462 B2* | 12/2010 | Breed .................. B60W 30/095 |
| | | | 356/28 |
| 7,986,260 B2 | 7/2011 | McMakin et al. | |
| 8,447,474 B2* | 5/2013 | Breed ................... G01S 17/931 |
| | | | 345/9 |
| 8,587,474 B2* | 11/2013 | Fuller .................... G01S 7/414 |
| | | | 342/21 |
| 8,937,570 B2 | 1/2015 | Sheen | |
| 9,000,994 B2* | 4/2015 | Shylo .................... G01S 13/89 |
| | | | 343/762 |
| 9,029,778 B1 | 5/2015 | Boyd et al. | |
| 9,162,622 B2* | 10/2015 | Szczerba .................. B60J 1/00 |
| 9,316,734 B2 | 4/2016 | Case et al. | |
| 9,715,012 B2 | 7/2017 | Fernandes et al. | |
| 10,205,457 B1* | 2/2019 | Josefsberg .............. H03L 7/091 |
| 10,823,841 B1* | 11/2020 | Lien ...................... G01S 13/88 |
| 10,890,656 B2* | 1/2021 | Heinen .................. G01S 7/412 |
| 2004/0080705 A1 | 4/2004 | Koh et al. | |
| 2004/0090359 A1* | 5/2004 | McMakin .............. G01S 13/89 |
| | | | 342/44 |
| 2004/0221790 A1 | 11/2004 | Sinclair et al. | |
| 2006/0164287 A1 | 7/2006 | Holt et al. | |
| 2007/0132631 A1* | 6/2007 | Henson .................. G01S 13/89 |
| | | | 342/25 R |
| 2007/0213933 A1 | 9/2007 | Zeng et al. | |
| 2007/0263907 A1 | 11/2007 | McMakin et al. | |
| 2008/0080599 A1 | 4/2008 | Kang et al. | |
| 2009/0262005 A1* | 10/2009 | McNeill .............. G01S 13/9029 |
| | | | 342/28 |
| 2009/0273509 A1 | 11/2009 | Fullerton | |
| 2009/0284405 A1 | 11/2009 | Salmon et al. | |
| 2009/0295618 A1 | 12/2009 | Beeri et al. | |
| 2010/0086228 A1 | 4/2010 | Cho et al. | |
| 2010/0182434 A1 | 7/2010 | Koch et al. | |
| 2010/0278008 A1 | 11/2010 | Ammar | |
| 2011/0273320 A1 | 11/2011 | Nogueira-Nine | |
| 2012/0062411 A1* | 3/2012 | Shylo ....................... H01Q 5/20 |
| | | | 342/94 |
| 2012/0105267 A1* | 5/2012 | DeLia .................... G06V 10/36 |
| | | | 378/70 |
| 2013/0121529 A1 | 5/2013 | Fleisher et al. | |
| 2013/0176309 A1 | 7/2013 | Sarkis | |
| 2014/0028457 A1 | 1/2014 | Reinpoldt et al. | |
| 2014/0091965 A1 | 4/2014 | Sheen | |
| 2014/0285375 A1 | 9/2014 | Crain | |
| 2014/0320331 A1* | 10/2014 | Fernandes ............. G01S 13/887 |
| | | | 342/22 |
| 2014/0368373 A1 | 12/2014 | Crain et al. | |
| 2014/0368378 A1 | 12/2014 | Crain et al. | |
| 2015/0025788 A1 | 1/2015 | Crain et al. | |
| 2015/0192669 A1* | 7/2015 | Shylo .................... G01S 13/89 |
| | | | 342/94 |
| 2015/0285901 A1 | 10/2015 | Rose | |
| 2015/0301167 A1* | 10/2015 | Sentelle ............... A61B 5/0205 |
| | | | 342/22 |
| 2016/0061948 A1* | 3/2016 | Ton ....................... G01S 7/4004 |
| | | | 342/22 |
| 2016/0116582 A1 | 4/2016 | Chang | |
| 2016/0213315 A1* | 7/2016 | Hyde ..................... A61B 90/90 |
| 2016/0213316 A1* | 7/2016 | Hyde ..................... A61B 5/443 |
| 2016/0291146 A1* | 10/2016 | Wang .................... G01S 13/867 |
| 2016/0363664 A1* | 12/2016 | Mindell ................ G01S 13/785 |
| 2017/0010352 A1 | 1/2017 | Liu et al. | |
| 2017/0176575 A1 | 6/2017 | Smits | |
| 2017/0307439 A1 | 10/2017 | Caucci et al. | |
| 2018/0143314 A1 | 5/2018 | Pelletier et al. | |
| 2018/0196135 A1 | 7/2018 | Crain et al. | |
| 2018/0259618 A1* | 9/2018 | Jales .................... G01S 15/104 |
| 2019/0004171 A1 | 1/2019 | Qi et al. | |
| 2019/0195998 A1* | 6/2019 | Campbell ............... G01S 13/87 |
| 2020/0041640 A1* | 2/2020 | Heinen .................. G01S 13/887 |
| 2020/0049415 A1* | 2/2020 | Schiffres ................ F28D 15/046 |
| 2020/0319332 A1 | 10/2020 | Sheen et al. | |
| 2020/0320731 A1 | 10/2020 | Sheen et al. | |
| 2021/0141083 A1* | 5/2021 | Crain ..................... H01Q 1/007 |
| 2021/0255312 A1* | 8/2021 | Inanlou ................. G01S 13/86 |
| 2021/0405182 A1* | 12/2021 | Reynolds .............. G01S 13/887 |

FOREIGN PATENT DOCUMENTS

| | | | | |
|---|---|---|---|---|
| WO | WO-2013141923 A2 * | 9/2013 | ............. | G01S 13/75 |
| WO | WO-2017113465 A1 * | 7/2017 | ............. | G01S 13/89 |
| WO | WO-2018147929 A2 * | 8/2018 | ........... | G01S 13/347 |
| WO | WO | 9/2021 | | |
| | PCT/US2020/026219 | | | |

OTHER PUBLICATIONS

WO PCT/US2020/026219 Search Rept., Aug. 3, 2020, Battelle Memorial Institute.

(56) References Cited

OTHER PUBLICATIONS

WO PCT/US2020/026219 Writ. Opin., Aug. 3, 2020, Battelle Memorial Institute.
Ahmed et al., "A Novel Fully Electronic Active Real-Time Imager Based on a Planar Multistatic Sparse Array", IEEE Transactions on Microwave Theory and Techniques vol. 59, No. 12, Dec. 2011, United States, pp. 3567-3576.
Appleby et al., "Standoff Detection of Weapons and Contraband in the 100 GHz to 1 THz Region", IEEE Transactions on Antennas and Propagation vol. 55, No. 11, Nov. 2007, pp. 2944-2956.
Baran et al., "Automatic Rigging and Animation of 3D Characters", ACM Transactions on Graphics vol. 26, No. 3, Jul. 2007, 8 pages.
Brem et al., "A Shooting and Bouncing Ray (SBR) Modeling Framework Involving Dielectrics and Perfect Conductors", IEEE Transactions on Antennas and Propagation vol. 63, No. 8, Aug. 2015, United States, pp. 3599-3609.
Cooper et al., "THz Imaging Radar for Standoff Personnel Screening", IEEE Transactions on Terahertz Science and Technology vol. 1, No. 1, Sep. 2011, United States, pp. 169-182.
Corazza et al., "A Markerless Motion Capture System to Study Musculoskeletal Biomechanics: Visual Hull and Simulated Annealing Approach", Annals of Biomedical Engineering vol. 34, No. 6, Jun. 2006, pp. 1019-1029.
Cordier et al., "A Data-Driven Approach for Real-Time Clothes Simulation", Computer Graphics Forum vol. 24 No. 2, 2005, United Kingdom, pp. 173-183.
Courtney et al., "Using GPUs to Accelerate Installed Antenna Performance Simulations", Proceedings of the 2011 Antenna Applications Symposium in Monticello, Illinois, 2011, United States, pp. 398-411.
Doerry et al., "Synthetic Aperture Radar", Optics & Photonics News, Nov. 2004, United States, pp. 28-33.
Eggert et al., "Estimating 3-D Rigid Body Transformations: A Comparison of Four Major Algorithms", Machine Vision and Applications vol. 9, Nos. 5-6, 1997, Germany, pp. 272-290.
Guerra-Filho, "Optical Motion Capture: Theory and Implementation", Journal of Theoretical and Applied Informatics (RITA) vol. XII, No. 2, 2005, Brazil, 29 pages.
Hokuyo Atomic Co., Ltd., "Distance Data Output/UTM-30LX-EW", available online at https://www.hokuyo-aut.jp/search/single.php?serial=170, 2014, accessed Sep. 17, 2018, 2 pages.
Horn, "Closed-Form Solution of Absolute Orientation Using Unit Quaternions", Journal of the Optical Society of America A vol. 4, No. 4, 1987, United States, pp. 629-642.
Kanazawa et al., "End-to-End Recovery of Human Shape and Pose", IEEE/CVF Conference on Computer Vision and Pattern Recognition, Jun. 2018, United States, pp. 7122-7131.
Kavan et al., "Geometric Skinning with Approximate Dual Quaternion Blending", ACM Transactions on Graphics vol. 27(4), 2008, United States, pp. 1-23.
Kee et al., "Efficient GPU Implementation of the High-Frequency SBR-PO Method", IEEE Antennas and Wireless Propagation Letters vol. 12, Jul. 2013, United States, pp. 941-944.
Kemp, "Millimetre Wave and Terahertz Technology for the Detection of Concealed Threats: A Review", Proceedings of SPIE Optics/Photonics in Security and Defense vol. 6402, 2006, Sweden, 19 pages.
Konolige et al., "Large Scale Visual Odometry for Rough Terrain", Robotics Research, 2010, United States, 12 pages.
Li et al., "Synthetic Aperture Radar Imaging Using a Small Consumer Drone", IEEE International Symposium on Antennas and Propagation & USNC/URSI National Radio Science Meeting, Jul. 19-24, 2015, United States, 2 pages.
Ling et al., "Shooting and Bouncing Rays: Calculating the RCS of an Arbitrarily Shaped Cavity", IEEE Transactions on Antennas and Propagation vol. 37, No. 2, Feb. 1989, United States, pp. 194-205.
Liu et al., "SSD: Single Shot MultiBox Detector", ECCV Lecture Notes in Computer Science vol. 9905, 2016, Germany, pp. 21-37.
Loper et al., "SMPL: A Skinned Multi-Person Linear Model", ACM Transactions on Graphics vol. 34(6), 2015, United States, 16 pages.
Luukanen et al., "Millimeter-Wave and Terahertz Imaging in Security Applications", Chapter 19 of Terahertz Spectroscopy and Imaging vol. 171, Springer Berlin Heidelberg, 2013, Germany, pp. 491-520.
Magnenat-Thalmann et al., "Joint-Dependent Local Deformations for Hand Animation and Object Grasping", Graphics Interface, Jun. 1988, Canada, pp. 26-33.
McMakin et al., "Biometric Identification using Holographic Radar Imaging Techniques", Proceedings of SPIE 6538, Sensors, and Command, Control, Communications, and Intelligence (C3I) Technologies for Homeland Security and Homeland Defense VI 65380C, Apr. 27, 2007, United States, 12 pages.
McMakin et al., "Dual-Surface Dielectric Depth Detector for Holographic Millimeter-Wave Security Scanners", Proceedings of SPIE 7309, Passive Millimeter-Wave Imaging Technology XII 73090G, May 1, 2009, United States, 10 pages.
McMakin et al., "Holographic Radar Imaging Privacy Techniques Utilizing Dual-Frequency Implementation", Proc. of SPIE 6943, Sensors, and Command, Control, Commun., and Intelligence (C3I) Tech. for Homeland Security and Homeland Defense VII 69430P, Apr. 3, 2008, United States, 10 pages.
Mensa, "High Resolution Radar Cross-Section Imaging", Norwood, MA, Artech House, 1991, United States, 10 pages.
Moeslund, "The Analysis-by-Synthesis Approach in Human Motion Capture: A Review", Dept. of Medical Informatics and Image Analysis, Institute for Electronic Systems, 1999, Denmark, 13 pages.
Moulder et al., "Development of a High-Throughput Microwave Imaging System for Concealed Weapons Detection", IEEE International Symposium on Phased Array Systems and Technology (PAST), Oct. 2016, United States, 6 pages.
Newell et al., "Stacked Hourglass Networks for Human Pose Estimation", ECCV Lecture Notes in Computer Science vol. 9912, 2016, Germany, pp. 483-499.
Nister et al., "Visual Odometry for Ground Vehicle Applications", Journal of Field Robotics vol. 23, No. 1, 2006, United Kingdom, pp. 3-20.
Nister et al., "Visual Odometry", Proceedings of the 2004 IEEE Computer Society Conference on Computer Vision and Pattern Recognition (CVPR), Jun. 2004, United States, 8 pages.
Ramanan et al., "Motion Analysis by Synthesis: Automatically Annotating Activities in Video", IEEE, Dec. 2005, United States, 26 pages.
Sheen et al., "Combined Illumination Cylindrical Millimeter-Wave Imaging Technique for Concealed Weapon Detection", Proceedings of SPIE vol. 4032, 2000, United States, pp. 52-60.
Sheen et al., "Cylindrical Millimeter-Wave Imaging Technique for Concealed Weapon Detection", Proceedings of SPIE 26th AIPR Workshop: Exploiting New Image Sources and Sensors, Oct. 1997. United States, pp. 242-250.
Sheen et al., "Reconstruction Techniques for Sparse Multi-Static Linear Array Microwave Imaging", Proceedings of SPIE vol. 9078, 2014, United States, 12 pages.
Sheen et al., "Three-Dimensional Millimeter-Wave Imaging for Concealed Weapon Detection", IEEE Transactions on Microwave Theory and Techniques vol. 49, No. 9, Sep. 2001, United States, pp. 1581-1592.
Sheen et al., "Cylindrical Millimeter-Wave Imaging Technique and Applications", Proceedings of SPIE Defense and Security Symposium vol. 6211, May 2006, United States, 10 pages.
Sheen et al., "High-Resolution 3D Microwave Imaging of a Moving Target Using Optical Motion Capture", Proceedings of SPIE Passive and Active Millimeter-Wave Imaging XXII, May 2019, United States, 11 pages.
Sheen et al., "Near-Field Three-Dimensional Radar Imaging Techniques and Applications", Applied Optics vol. 49, No. 19, Jul. 2010, United States, pp. E83-E93.
Sheen et al., "Standoff Concealed Weapon Detection Using a 350 GHz Radar Imaging System", Proceedings of SPIE Defense, Security, and Sensing vol. 7670, 2010, United States, 12 pages.
Sheen et al., U.S. Appl. No. 62/829,531, filed Apr. 4, 2019, titled "High-Resolution 3D Microwave Imaging of a Moving Target using Optical Motion Capture", 36 pages.

(56) References Cited

OTHER PUBLICATIONS

Sheen, "Sparse Multi-Static Arrays for Near-Field Millimeter-Wave Imaging", IEEE Global Conference on Signal and Information Processing (GlobalSIP), Dec. 2013, United States, pp. 699-702.
Sick, "2D LiDAR Sensors", 2018, accessed Oct. 31, 2020, available online at https://www.sick.com/us/en/detection-and-ranging-solutions/2d-lidar-sensors/c/g91900, 13 pages.
Szeliski, "Computer Vision: Algorithms and Applications", New York, Springer, 2011, United States, 824 pages.
Velodyne LiDAR, "HDL-64E", 2018, accessed Sep. 17, 2018, available online at https://velodynelidar.com/hdl-64e.html, 2 pages.
Wareham et al., "Bone Glow: An Improved Method for the Assignment of Weights for Mesh Deformation", AMDO Lecture Notes in Computer Science vol. 5098, 2008, Germany, pp. 63-71.
Wikipedia, "Microwave", available online at https://en.wikipedia.org/wiki/Microwave, Apr. 3, 2019, 20 pages.
Wikipedia, "Microwave", available online at https://en.wikipedia.org/wiki/Microwave, Mar. 31, 2020, 21 pages.
Zhuravlev et al., "Inverse Synthetic Aperture Radar Imaging for Concealed Object Detection on a Naturally Walking Person", Proceedings of SPIE vol. 9074, 2014, United States, 11 pages.
Zhuravlev et al., "ISAR for Concealed Objects Imaging", Proceedings of SPIE-IS&T vol. 9401, 2015, United States, 15 pages.
Zhuravlev et al., "Microwave Imaging of Moving Subjects by Combined Use of Video-Tracker and Multi-Static Radar", IEEE International Conference on Microwaves, Communications, Antennas and Electronic Systems, Nov. 2015, Israel, 5 pages.

\* cited by examiner

IMAGING SYSTEMS AND RELATED METHODS INCLUDING RADAR IMAGING WITH MOVING ARRAYS OR MOVING TARGETS

RELATED PATENT DATA

This application claims the benefit of U.S. Provisional Patent Application Ser. No. 62/829,531, filed Apr. 4, 2019, titled "High-Resolution 3D Microwave Imaging of a Moving Target using Optical Motion Capture", the disclosure of which is incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

This disclosure relates to imaging systems, including radio frequency (RF), microwave and millimeter-wave systems, and related methods.

BACKGROUND OF THE DISCLOSURE

Systems have been utilized to enhance security at numerous public venues, including airports, public arenas, courthouses, etc. These systems have been primarily directed towards detecting objects, such as weapons, explosives, etc. which are concealed under clothing of individuals.

Radar imaging technology has been shown to detect concealed weapons of individuals because these signals are able to penetrate common clothing materials and are amenable to precise mathematical focusing techniques. Cylindrical imaging systems based on radar imaging technology have been widely deployed in airports for checkpoint passenger screening. Although the currently fielded systems are highly versatile, limitations include requiring the passenger to assume a defined pose during the screening process, limited passenger throughput, and substantial system footprint.

The present disclosure describes systems which may be used to address these limitations and improve passenger convenience and screening throughput. Some example embodiments described below are directed towards methods and apparatus which enable scanning and imaging of targets with use of a non-uniform scanning aperture or complex target motion. Additional embodiments and details thereof are also discussed below.

BRIEF DESCRIPTION OF THE DRAWINGS

Example embodiments of the disclosure are described below with reference to the following accompanying drawings.

DETAILED DESCRIPTION OF THE DISCLOSURE

Figure 1:
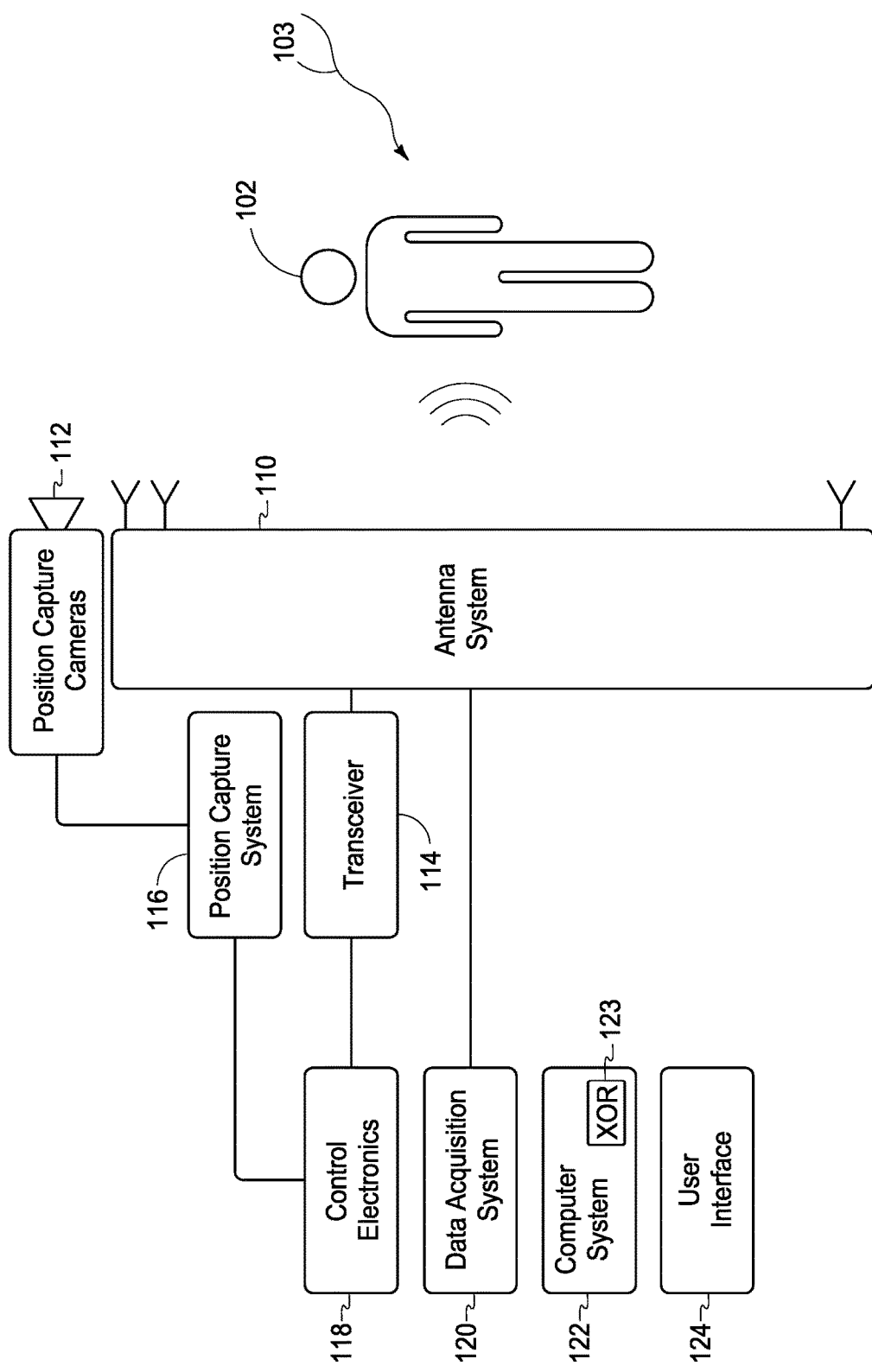
FIG. 1 is an illustrative representation of an imaging system for scanning of moving targets according to one embodiment.

This disclosure is submitted in furtherance of the constitutional purposes of the U.S. Patent Laws "to promote the progress of science and useful arts" (Article 1, Section 8).

The reader is directed to the following US utility applications which were filed the same day as the present application: "Imaging Systems and Related Methods Including Radar Imaging with Moving Arrays or Moving Targets", naming David M. Sheen, Richard Trevor Clark, Jonathan R. Tedeschi, A. Mark Jones and Thomas E. Hall as inventors; and "Imaging Systems and Related Methods Including Radar Imaging with Moving Arrays or Moving Targets", naming David M. Sheen and Richard Trevor Clark as inventors, and the teachings of each are incorporated herein by reference.

Some example imaging systems described herein are designed to improve passenger convenience and screening throughput by allowing a person to walk naturally through the imaging system during scanning of the person. Millimeter-wave imaging systems acquire data over a 2D spatial aperture to form a high-resolution image. Some conventional scanning systems use mechanical scanners or large antenna arrays that provide a 2D aperture and provide strict control over the position of the transceiver in relation to a motionless target. Some embodiments described herein replace the controlled mechanical scan with motion of the passenger or a movement of an antenna array which is not strictly controlled.

In one implementation described below with respect to FIG. 1, motion of the passenger is optically tracked as he or she passes by one or more stationary RF, microwave, or millimeter-wave arrays. Multiple linear arrays may be used to illuminate the passenger from a wide variety of angles to provide full coverage of the body. The radar data are then correlated with spatial information from the position capture system by employing generalized synthetic aperture focusing or back-projection techniques. These methods accurately reconstruct the image by integrating the measured response multiplied by the conjugate of the expected response from a point scatterer anywhere within a 3D image volume. This process yields optimally focused images revealing contents concealed by a target.

Active microwave- and millimeter-wave imaging may be performed using mathematical techniques to focus the radar or imaging data. Mathematical focusing utilizes precise measurement of the phase of the wave that is scattered from the imaging target and embodiments described herein use a position capture system to determine position information of a moving imaging array or target during scanning using optical cameras or other position determination techniques.

Accurate image reconstruction for non-uniformly scanned radar data is implemented in some embodiments described below using the positions of the antennas and target points (e.g., voxels) during the simultaneous generation of the radar data and movement of one of the antennas or target. This reconstruction can be accomplished in one embodiment using techniques known as generalized synthetic aperture focusing technique (GSAFT) or back-projection. These methods are analogous to a matched filter that integrates the measured response multiplied by the conjugate of the response expected from a point scatterer at any point in a 3D image volume. Performing this correlation at each point throughout a 3D volume yields the optimally focused image in one embodiment. These techniques also allow versatile focusing algorithms to be developed for arbitrary spatial scanning arrangements or complex target motions.

Referring to FIG. 1, an imaging system 100 having a fixed or stationary antenna array according to one embodiment of the disclosure is shown. Imaging system 100 is configured to scan and generate images regarding targets 102 (e.g., people) that move past an antenna array of system 100 including images which reveal articles which may be concealed beneath clothing of the targets 102.

The illustrated imaging system 100 includes an antenna system 110, position capture cameras 112, transceiver 114, position capture system 116, control electronics 118, data acquisition system 120, computer system 122, and user interface 124. Other embodiments of imaging system 100 are possible including less, more and/or alternative components.

Figure 3:
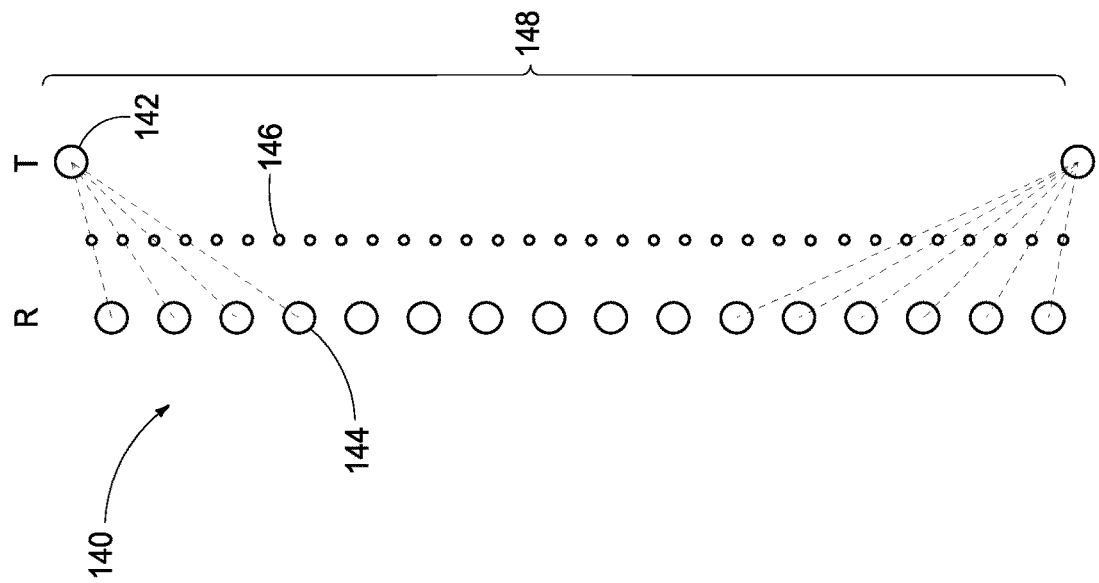
FIG. 3 is an illustrative representation of a sparse array design of an antenna array according to one embodiment.

In the depicted example, target 102 moves adjacent to a stationary antenna array of antenna system 110 during use. Self-scanning of the target 102 is implemented by motion 103 of target 102 adjacent to antenna system 110. Antenna system 110 includes an antenna array comprising transmit antennas which are configured to emit electromagnetic energy towards target 102 responsive to electrical signals received from transceiver 114 and receive antennas which are configured to receive electromagnetic energy reflected from the target 102 and output electrical signals to the transceiver 114 and which correspond to the received electromagnetic energy. Antenna system 110 may additionally include a switching network or matrix to selectively chose different pairs of transmit and receive antennas in some embodiments which are discussed below. Details regarding one configuration of an antenna array are shown in FIG. 3.

Transceiver 114, antenna system 110 (including the switching matrix and antenna array), control electronics 118, and data acquisition system (DAQ) 120 may be referred to as a radar system of the imaging system in some embodiments. The radar system emits electromagnetic energy towards the target 102, receives electromagnetic energy reflected from the target 102, and generates radar data indicative of the received electromagnetic energy. Other embodiments of the radar system may be used in other implementations.

Position capture cameras 112 are configured to monitor locations and movement of target 102 for example walking by the antenna system 110. The cameras 112 capture images for a plurality of frames during movement of the target 102. Position capture system 116 is configured to generate position information at a plurality of moments in time and which is indicative of different locations of the target during movement of the target 102 with respect to the antenna array and during scanning of the target 102. Position information may include rotation information in some embodiments. The determined position information may be further processed with respect to time to provide motion information regarding the movement of the target 102 during the scanning. The determined positional or motional information of target 102 may be used to focus the radar data as described below.

Transceiver 114 is coupled with antenna system 110 and controls the emission of the electromagnetic energy from the transmit antennas and generates output signals which correspond to the electromagnetic energy received by the antenna system 110 from the target 102.

Position capture system 116 receives and processes the image data from the position capture cameras 112 to determine location information in a coordinate space regarding target 102 within a plurality of frames and which also be used with timing information to provide motion information regarding the movement of the one or more targets between the frames. In an example embodiment discussed below, position capture system 116 is implemented as an optical position capture system configured to monitor locations of the target at different moments in time using output from position capture cameras 112. Different locations of the target 102 between different frames correspond to movement of the target 102 between the frames.

Control electronics 118 are configured to control transmit and receive operations of antenna system 110 including switching of antennas therein.

Data acquisition system 120 is configured to receive the output signals from transceiver 114 that are indicative of the received electromagnetic energy and to generate radar data including a plurality of intensities for a plurality of voxels of a scanned aperture as discussed further below.

Computer system 122 includes processing circuitry 123 configured to process the position information and the radar data to generate image data regarding the target 102 during movement of the target 102. As discussed in example embodiments below, the processing circuitry 123 is configured to use the position information of the target 102 (or antenna array as also discussed below) to weight intensities of a plurality of voxels of the radar data. Storage circuitry (not shown) such as appropriate memory may also be provided to store radar data, position information, programming and any other appropriate information.

Processing circuitry 123 is configured to implement desired programming provided by appropriate computer-readable storage media in at least one embodiment. For example, the processing circuitry may be implemented as one or more processor(s) and/or other structure configured to execute executable instructions including, for example, software and/or firmware instructions. Other example embodiments of processing circuitry include hardware logic, PGA, FPGA, ASIC, state machines, and/or other structures alone or in combination with one or more processor(s). These examples of processing circuitry are for illustration and other configurations are possible.

User interface 124 is configured to interact with a user including using the image data to display graphical images of a target and which may include concealed articles within the target's clothing. In addition, user interface 124 is also configured to receive inputs from the user, for example via a mouse and/or keyboard and which control operations of imaging system 100 in one embodiment.

Figure 2:
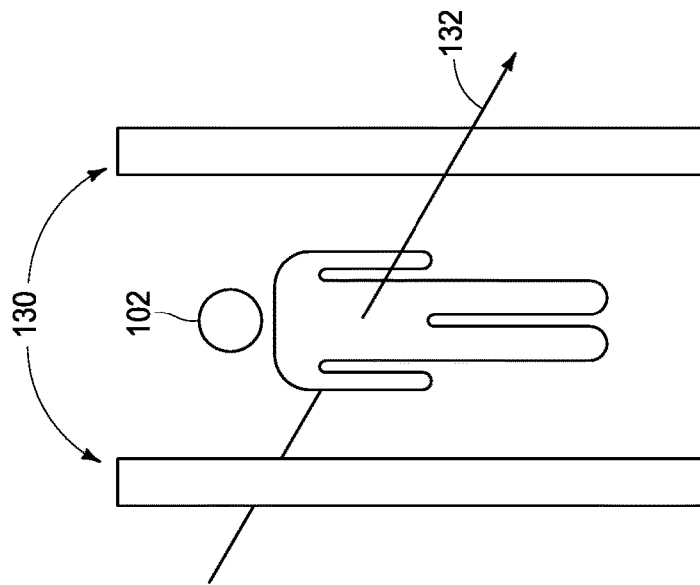
FIG. 2 is an illustrative representation of columns of antenna arrays of an imaging system according to one embodiment.

Referring to FIG. 2, a plurality of linear antenna array columns 130 are shown according to one embodiment for use in a walk-by imaging application. The columns 130 are arranged opposite to one another and positioned to image opposite sides of a target 102 moving on a path 132 between columns 130. Each column 130 includes an antenna array which includes both transmit and receive antennas and which are discussed in further detail in FIG. 3. Real-time, high-speed data collection is used in one embodiment to effectively freeze the motion of the target 102 during a single linear array data frame from each column 130 and to allow fine sampling of the continuous motion of the target 102 passing through the system 100.

Referring to FIG. 3, a layout of a switched linear antenna array 140 which may be implemented within a column 130 is shown according to one embodiment. The transmit antennas 142 and receive antennas 144 are implemented in separate columns of a two-column array and antennas that may be up to several wavelengths wide in both cross-sectional dimensions may be used. This technique provides uniform spatial effective sampling which may be used for low-artifact imaging and Fourier transform-based image reconstruction and dense sub-wavelength effective sampling to avoid spatial aliasing during image reconstruction. Furthermore, numerous transmit locations are provided for angularly diverse illumination of the target 102 and extreme separation of transmit and receive antenna locations is not needed for effective sampling and allows operation in the near-field of the antenna array (i.e., distances that are shorter than, or less than, a small multiple of the imaging aperture dimensions). The pattern shown in FIG. 3 represents the pattern of a single unit cell 148. In some embodiments, a plurality of the unit cells may be utilized in a larger array that repeats the illustrated pattern of FIG. 3.

The spacing of the transmit antennas 142 is different with respect to the spacing of the receive antennas 144 to provide interleaving of samples which enables increased sampling in the illustrated arrangement. In FIG. 3, sixteen receive antennas 144 are provided for each transmit antenna 140. Other antenna arrangements having different numbers of transmitter antennas and receive antennas may be used in other embodiments.

In one implementation, the antenna array 140 of each column 130 is a sequentially switched linear array that allows one dimension of the imaging aperture to be effectively scanned electronically at high speed and which is accomplished by sequencing through each transmit and receive pair of antennas using microwave-or millimeter-wave switching networks connected to the radar transceiver. Continuous data collection as the target 102 moves adjacent to or through the imaging system 100 then completes the sampling of an effective 2D imaging aperture.

The design of the switched linear antenna array 140 for a particular application is primarily driven by the length of the array, sub-wavelength effective sampling requirement, and suitability for cost-effective implementation. In one embodiment, a sparse array technique is utilized which achieves required sampling density with a reasonable number of antennas by using multiple combinations of transmit and receive antennas to increase the density of aperture samples while reducing the number of antenna elements. Details regarding suitable antenna arrays including sparse arrays are described in U.S. Pat. No. 8,937,570 and Sheen, DM, "Sparse Multi-Static Arrays for Near-Field Millimeter-Wave Imaging," In 2013 *IEEE Global Conference on Signal and Information Processing, GlobalSIP*, IEEE Computer Society, pp. 699-702, 2013, the teachings of which are incorporated herein by reference. The use of a sparse array technique according to some embodiments of the disclosure reduces the number of transmit and receive antennas required to densely sample a linear axis and provide a single column of virtual samples. Furthermore, different designs of the antenna array may be utilized in different implementations apart from the example sequentially switched linear array discussed herein.

In one embodiment, the number of transmit antennas 142 is reduced compared to the number of receive antennas 144 so that integrated switches are only used for the receiver array modules. As mentioned above, one transmit antenna 142 is provided for every sixteen receive antennas 144 and the pattern is repeated for eight-unit cells 148. Note that a single unit cell 148 of the array is shown in FIG. 3. In addition, the example array 140 was designed for a length of 2 m with a typical offset from the walking path 132 of the target 102 by 0.75 m.

The sparse array design of antenna array 140 is developed using the quasi-monostatic principle, in which the effective sample location 146 for each transmit/receive pair is approximately the midpoint between the two antenna locations. FIG. 3 shows several of these T/R pairings near the top and bottom of a single 1:16 unit cell 148. Pairing the receive antennas 144 with the top transmit antenna 142 samples the upper half of the unit cell 148, and pairing with the bottom transmit antenna 142 samples the lower half of the unit cell 148. The effective sample locations 146 are uniformly spaced at one-half of the receiver spacing for thirty-two samples across the unit cell 148 in the illustrated embodiment.

Figure 5:
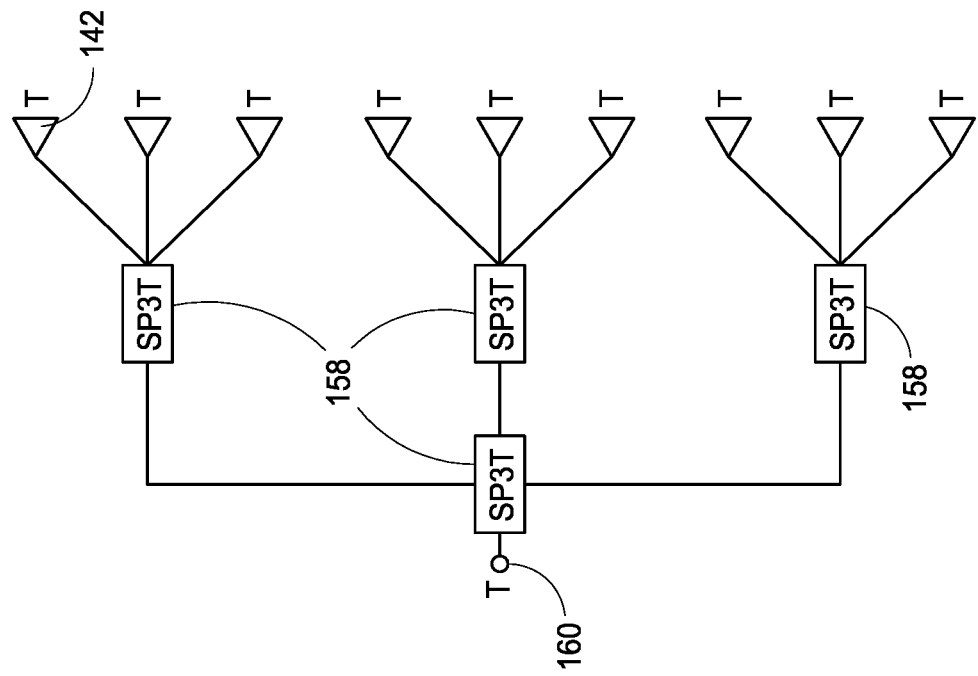
FIG. 5 is an illustrative representation of a signal distribution switching manifold for a transmit antenna array according to one embodiment.
Figure 4:
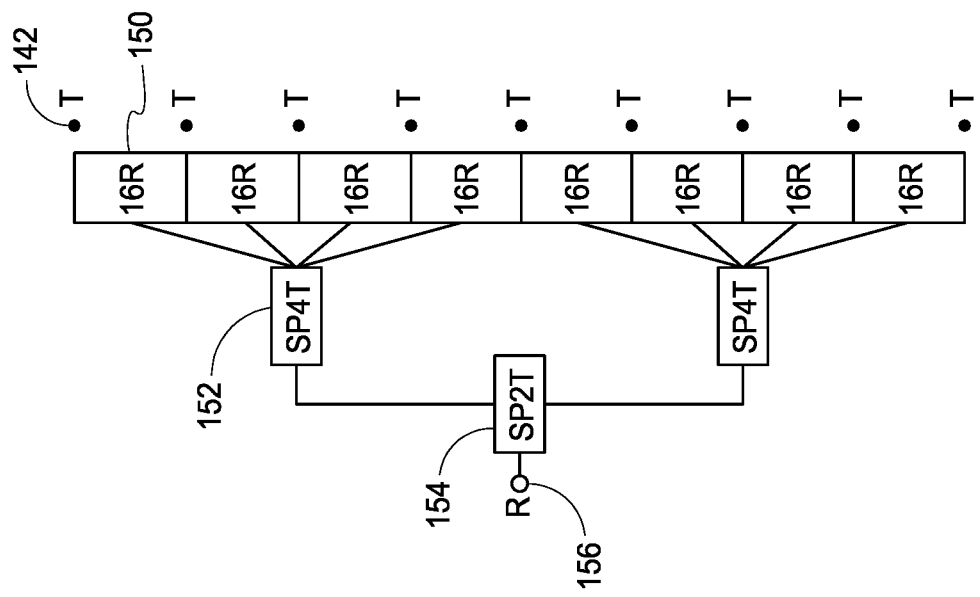
FIG. 4 is an illustrative representation of a signal distribution switching manifold for a receive antenna array according to one embodiment.

Referring to FIGS. 4-5, the overall switching networks for the receive and transmit linear array columns are respectively shown in example embodiments.

FIG. 4 shows the receiver switching network where receive antennas are grouped into 16-element modules 150 and driven by a switching network of single-pole four-throw (SP4T) switches 152 and a single-pole two-throw (SP2T) switch 154 which is coupled with an output 156. Electrical signals corresponding to electromagnetic energy received by the receive antennas 144 are provided at output 156 and may be conducted to transceiver 114.

FIG. 5 shows the transmitter switching network including four single-pole three-throw (SP3T) switches 158 coupled with the transmit antennas 142. Electrical signals from transceiver 114 which cause the emission of electromagnetic energy from the transmit antennas 142 are received in the switching network at input 160. Appropriate amplifiers, attenuators, isolators, and other conventional components may be used in addition to the illustrated switching networks to set appropriate power levels throughout the antenna array 140 and to provide sensitive signal detection.

Figure 6:
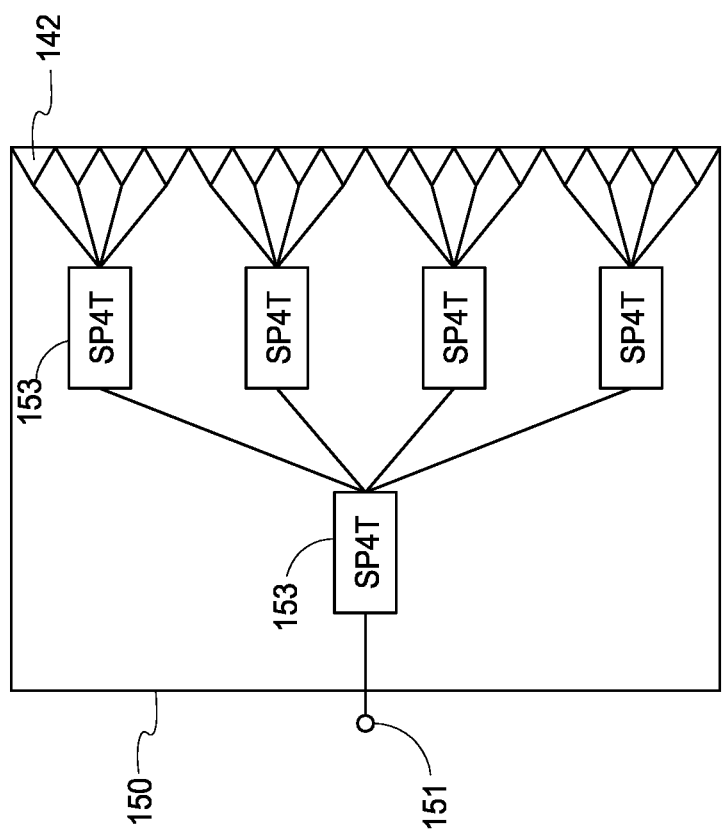
FIG. 6 is an illustrative representation of a 16-element receive module for a receive antenna array according to one embodiment.

Referring to FIG. 6, the receive antennas 142 may be grouped into 16-element integrated modules 150 to reduce cost and complexity in one embodiment. Each integrated module 150 is composed of an output 151 (which is coupled with a switch 152 of FIG. 4) and five surface-mount SP4T switches 153 with integrated printed circuit antennas 142 as shown schematically.

The overall array 140 is composed of 8 unit cells 148 and therefore achieves 256 effective samples in one embodiment. In addition, the array length is 2.0 m and therefore the effective sampling interval is 7.8 mm along the array axis in this example embodiment. In addition, the center frequency 15 GHz of an example 10-20 GHz bandwidth has a wavelength of 2.0 cm which provides adequate sampling for high-quality imaging performance over the 10-20 GHz band. Other ranges of frequencies may be used between 0.1-100 GHz in other example embodiments.

In one embodiment, imaging system utilizes antennas having a wide frequency bandwidth, wide beamwidth over the full bandwidth, and compact dimensions suitable for close array spacing. Additionally, a printed-circuit antenna design may be utilized to allow a large array to be efficiently fabricated and printed-circuit antennas also allow surface-mount switches and other microwave components to be conveniently integrated.

Figure 7:
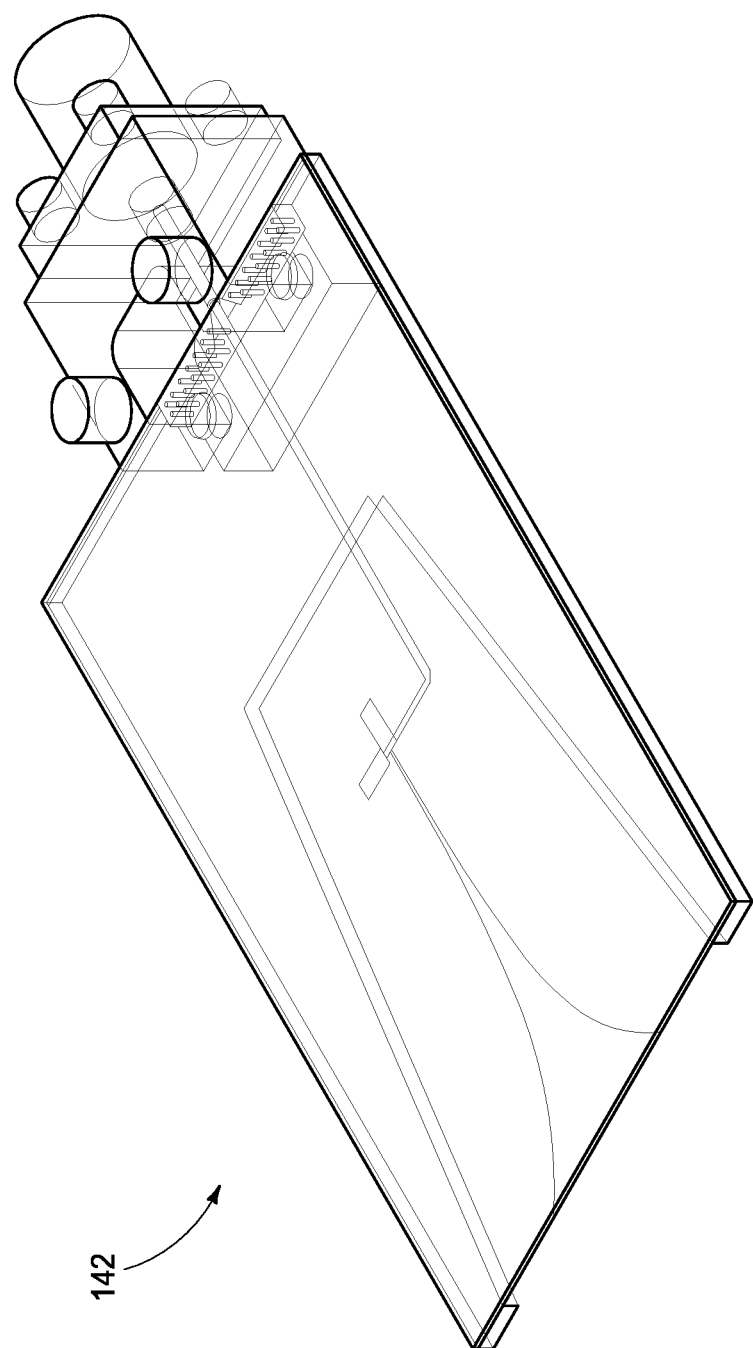
FIG. 7 is an illustrative representation of a transmit antenna according to one embodiment.

Referring to FIG. 7, a transmit antenna 142 having an exponentially tapered slot antenna design which may be utilized in array 140 is shown. Each transmit antenna 142 is individually connected to a respective switch network using conventional coaxial cables and connectors. The FWHM beamwidth for this antenna 142 at a center frequency of 15 GHz is approximately 60 degrees in both principal planes. The transmit antenna boards may have a fiberglass (FR-4) layer surrounding the antenna 142 to provide mechanical stability. The fiberglass is removed from areas around the antenna 142 to prevent degradation of the antenna performance.

Figure 8:
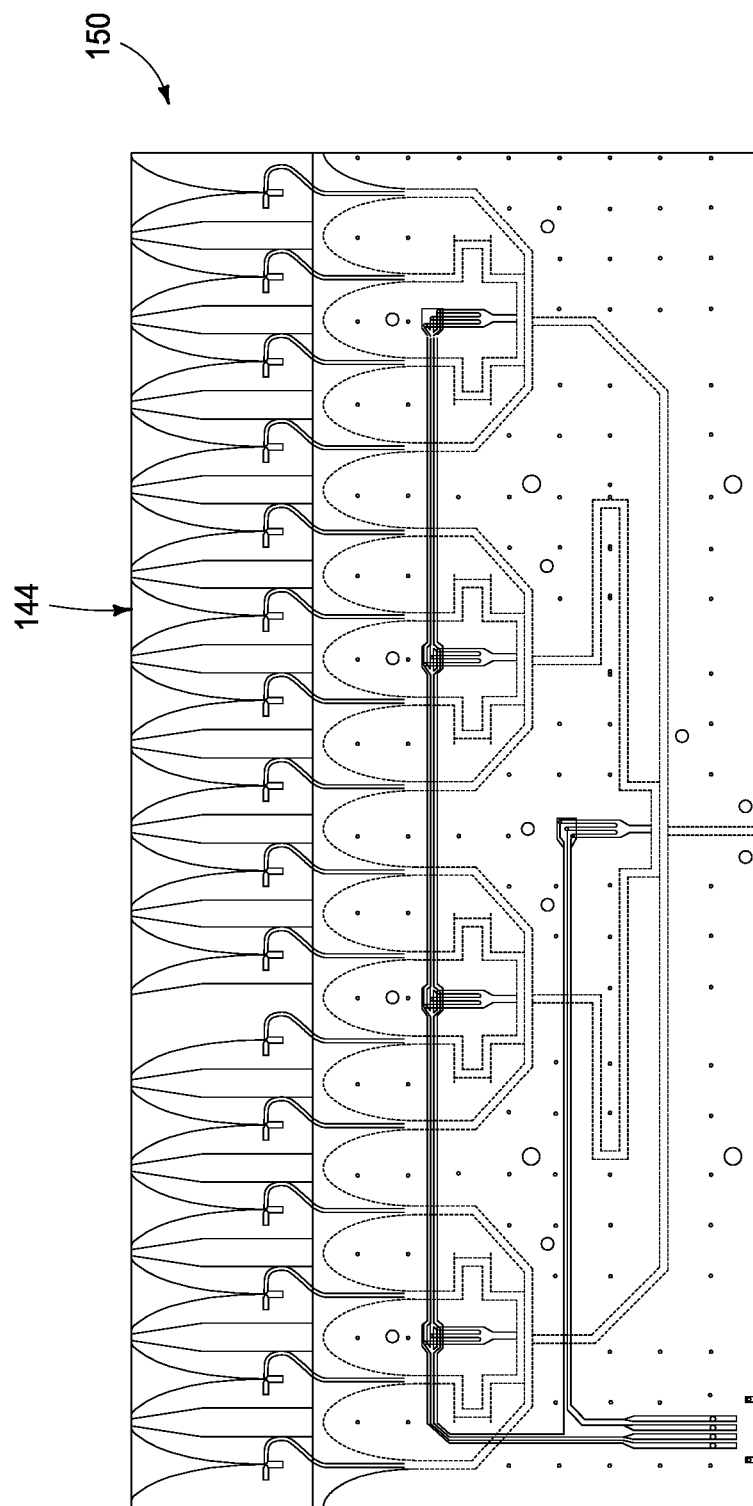
FIG. 8 is an illustrative representation of a 16-element receive module with integrated switches according to one embodiment.

Referring to FIG. 8, a receive antenna module 150 including sixteen receive antennas 144 and integrated switches are shown according to one embodiment. Use of eight modules 150 provides a 128-element receive array. Grouping the receive antennas 144 into sixteen-element modules with integrated switches reduces the amount of microwave cabling used to fabricate the array, and simplifies power and digital electronic control wiring to the array. Surface-mount switches in the DC to 20 GHz range are available in SP4T configurations and five SP4T switches are used to develop a sixteen-element switch network in one embodiment. This switch network then directly feeds tapered slot antennas 144 similar in design as the transmit antennas in one embodiment. The illustrated module 150 may be connected to transceiver 114 using a single coaxial microwave cable and a compact power/digital control connector. The microwave signals are routed to all switches using printed grounded coplanar waveguide (GCPW) with a GCPW-to-microstrip transition to feed each antenna 144 in one embodiment.

Figure 9:
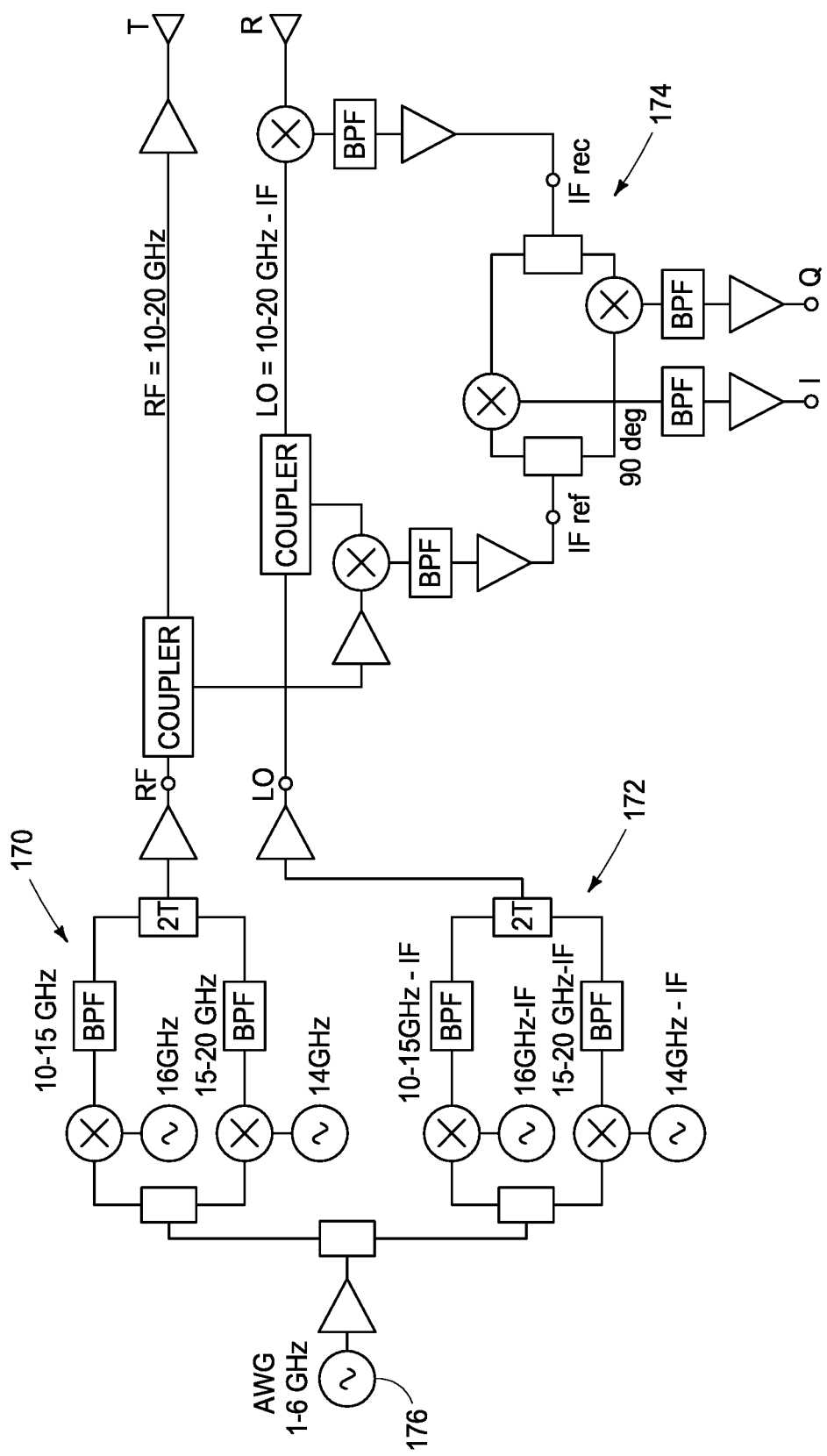
FIG. 9 is a schematic representation of a transceiver according to one embodiment.

Referring to FIG. 9, an architecture of one embodiment of a suitable transceiver 114 which may be utilized in the imaging system 100 is shown. The illustrated transceiver 114 is configured to control the emission of electromagnetic energy including a sweep of a plurality of different frequencies of a specified bandwidth.

One example transceiver 114 which may be used has a wideband heterodyne frequency-modulated continuous-wave (FM-CW) design and two tracking oscillators. A radio frequency (RF) oscillator 170 is linearly swept over the desired frequency range and transmitted and a local oscillator (LO) 172 is offset from the RF oscillator 170 by an intermediate frequency (IF) and drives a receive mixer 174.

The received signal is down-converted by mixer 174 to the intermediate frequency by the local oscillator 172 and then down-converted to baseband using an intermediate frequency reference signal. The measured in-phase (I) and quadrature (Q) signals contain the received amplitude and phase information used in the 3D image reconstruction in one embodiment.

In one embodiment, a full frame of radar data consists of two frequency sweeps for each of the T/R pairings (256 total) and a full frame is collected at a uniform pulse-repetition frequency (PRF) set by the data acquisition computer in one embodiment. A frequency sweep time of 12 microseconds was chosen to allow for full-frame radar data acquisition at a PRF in excess of 300 Hz. As discussed further below, two frequency sweeps are used in one embodiment to cover a full 10 GHz bandwidth using two 5 GHz sweeps from the AWG.

The illustrated transceiver 114 uses a high-speed (24 GSamples/sec.) arbitrary waveform generator (AWG) 176, such as a Tektronix AWG7122B, to provide fast-sweeping. The AWG 176 is capable of producing a frequency sweep (chirp) within a bandwidth from DC to 6 GHz over sweep times of less than one microsecond in this embodiment. To achieve a 10-20 GHz band using the available bandwidth of the AWG 176, the total band was divided into two 5 GHz bands (10-15 GHz and 15-20 GHz). The generated chirp is then split into RF (upper) and LO (lower) branches.

On the upper RF branch, the chirp is directed to a power splitter and up-converted using fixed phase-locked oscillators and filtered to form chirp signals that cover either the 10-15 GHz or 15-20 GHz bands. The appropriate band is then selected by a single-pole double-throw (SPDT) switch.

The lower LO branch operates similarly except that it is offset by the IF frequency. The baseband I and Q signals are then obtained by mixing the received signal with an IF reference signal. In one embodiment, the LO oscillators are offset by the intermediate frequency and all oscillators are phase-locked to a common reference (PLOs).

Figure 10:
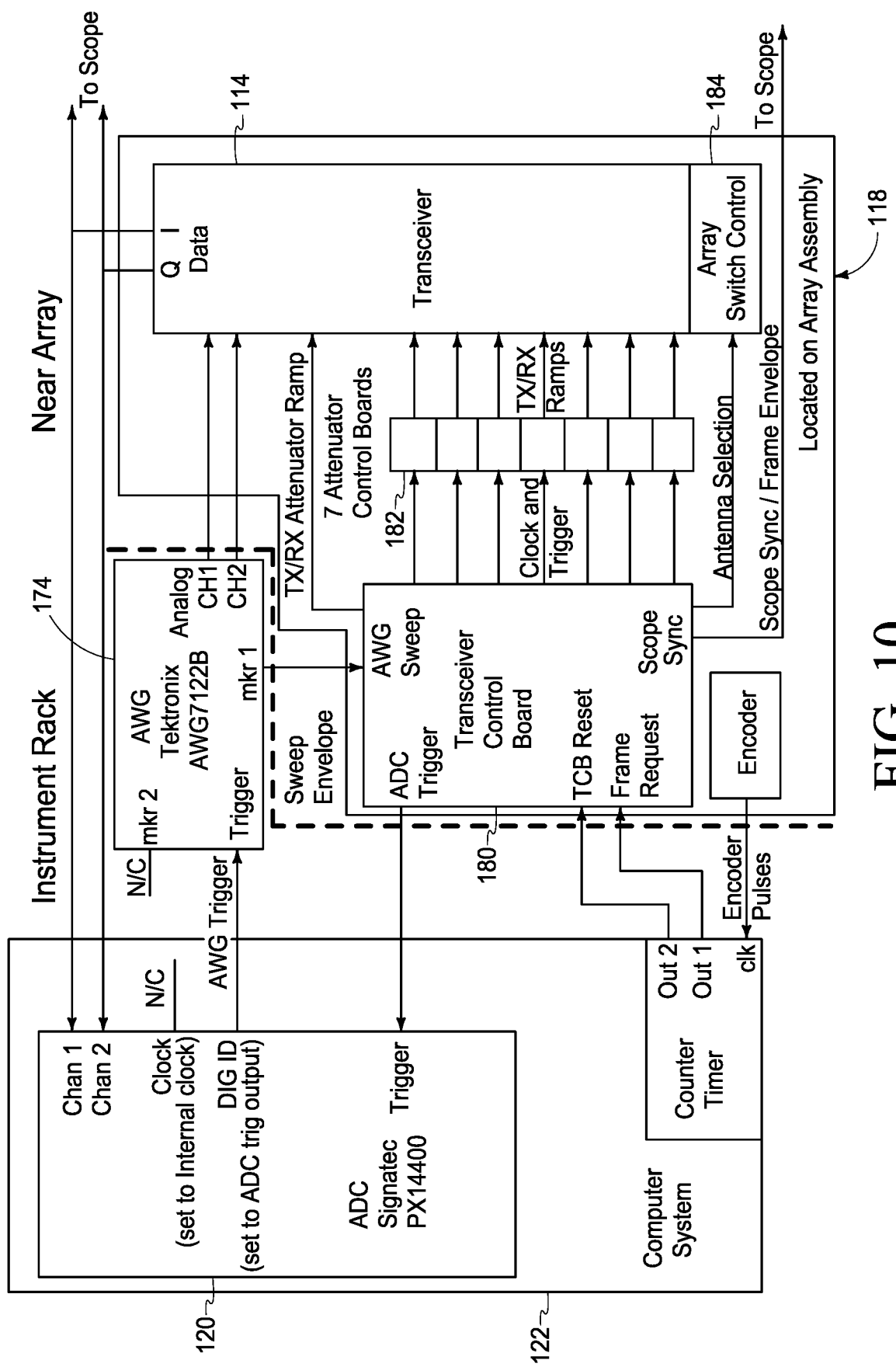
FIG. 10 is a functional block diagram of components of computer and radar systems according to one embodiment.

Referring to FIG. 10, one embodiment of control electronics 118, a data acquisition system 120 and computer system 122 are shown. The control electronics 118 include a transceiver control board 180, seven attenuator control boards 182 and an array switch control 184 that provide the electronics interface that controls the imaging system. This subsystem sequences and controls the array switching, controls the operation of transceiver 114, controls the AWG 176, and provides the control logic for the data acquisition system 120. The data acquisition system 120 acquires and digitizes the transceiver output data. System 120 also buffers the transceiver output data and sends it to the computer system 122. The data transfer rates for this system are driven primarily by array frame rate (PRF) and spatial and frequency sampling intervals.

Example functions of the computer system 122 are to perform waveform signal processing, calibration, configuring data acquisition, control scanning electronics, control the transceiver, control the switched linear array and generate image data for use in displaying graphical images of the target. The computer system 122 may be implemented as a high-performance PC workstation that supports fast image reconstruction and processing that exploits the parallel processor architecture of modern Windows® computers in one embodiment.

Figure 11:
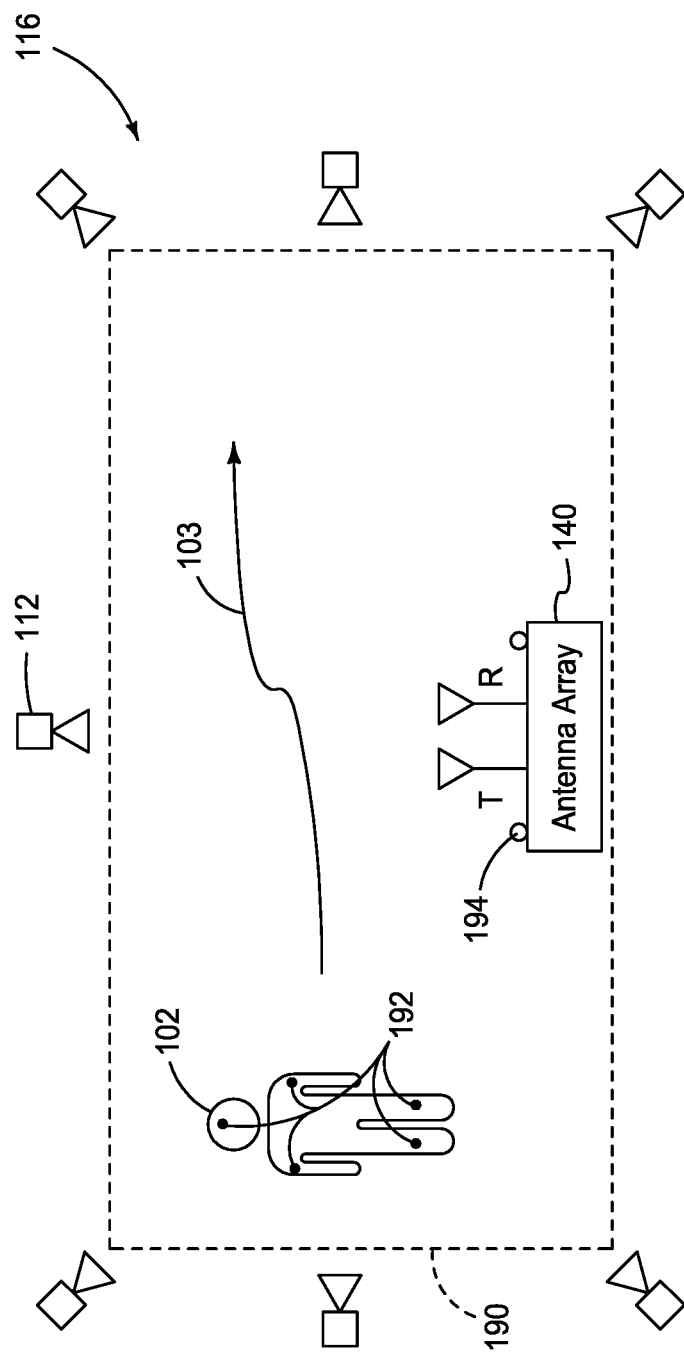
FIG. 11 is an illustrative representation of a position capture system according to one embodiment.

Referring to FIG. 11, one embodiment of a position capture system 116 is shown. An antenna array 140 is placed in a stationary position within a measurement or position capture volume 190 in the depicted embodiment. The position capture system 116 includes a plurality of position capture cameras 112 positioned at fixed, stationary positions around the periphery of the volume 190 and that are individually configured to track locations of the antenna array 140 and the target 102 within the volume 190 at different moments in time.

A plurality of markers 192 are placed upon the target 102 moving along a path of movement 103 through the volume 190 with use of a marker-based position capture system 116 according to one embodiment. In addition, plural optical markers 194 are placed on the antenna array 140 so that the positions of the transmit and receive antennas can be precisely calculated from measured positions of the optical markers 194. Position capture cameras 112 track locations of markers 192, 194 on the target 102 and antenna array 140 respectively and tracked locations are used by system 116 to generate the position information and/or motion information regarding the target 102 (e.g., with use of timing information of the generated position information). A plurality of cameras 112 often used to reduce the effects of obscuration or camera field-of-view limitations and triangulation is used to calculate the 3D position of each marker 192, 194. Software from system 116 provides positional and/or motion information for rigid-body targets or more complicated animated motion estimation in some embodiments.

In one more specific embodiment, position capture system 116 is implemented as a commercially-available marker-based system available from NaturalPoint, Inc. DBA OptiTrack that utilizes Prime 41 cameras and the Motive software.

Data acquisition may be performed continuously at a fixed PRF and the marker-based OptiTrack motion-capture system can operate at rates up to 180 Hz that is typically selected for data collection.

The radar and position information are acquired and stored in real-time for subsequent post-processing. The radar data and position information are synchronized in time with respect to one another and the position information is used to focus the radar data of the moving target 102 thereby generating image data that is used to create images of the target 102 in one embodiment. The radar and position information are collected synchronously and triggered together to provide time-aligned data in one embodiment.

The antenna array 140 provides wide-beamwidth, wide-bandwidth (10-20 GHz) radar imaging data from a 2 m vertical aperture at a repetition rate of over 300 Hz in one embodiment. This array 140 is used with a position capture system 116 that provides target position information that can be used to reconstruct or focus the image data. Acquired position data regarding locations of the target 102 moving through the volume 190 is used to focus the radar data into human-perceptible (visible) images which may reveal contents under clothing or otherwise concealed of target 102.

Additional specifications of one embodiment of imaging system 100 are set forth below in Table A.

TABLE A

| | | | |
|---|---|---|---|
| Frequency Range: | 10-20 GHz | Receive Antennas (Total): | 128 |
| Frequency Samples: | 512 | Transmit Antennas (Total): | 9 |
| Center Frequency: | 15 GHz | Antenna Polarization: | Vertical |
| Wavelength at Center Frequency: | 2 cm | Antenna Design: | Vivaldi (tapered slot) |
| Range Resolution: | 1.5 cm | | |
| Lateral Resolution: | 1 cm (60 degree beamwidth) | Antenna Beamwidth (FW-HM, Nominal): | 60 degrees |
| | | T/R Column Separation: | 10 cm |
| Array Length: | 2 m | | |
| Array Orientation: | Vertical | Sampling Interval: | 7.8 mm |
| Array Elements (Samples): | 256 | Transceiver Sweep Time: | 12 μsec |
| Array Design: | 1:16:8 sparse linear array | Detection: | Coherent (in-phase/quadrature (I/Q)) |
| Transmit Antennas per Module: | 1 | Array Frame Collection Interval: | 3.072 msec |
| Receive Antennas per Module: | 16 | Maximum Array Frame Repetition: | 325 Hz |
| Modules: | 8 | Marker-Based Position capture: | OptiTrack System |

The following discussion details example implementations of generalized synthetic aperture image reconstruction techniques that are suitable for forming high-resolution 3D images from a wide variety of imaging scenarios with non-uniformity caused by irregular scanning, independent transmit and receive antenna locations, and moving targets. Example scenarios described below include scanned non-uniform apertures and moving targets in front of fixed multistatic sparse arrays.

The processing of radar data and position information discussed below may be implemented by processing circuitry of computer system 122 or processing circuitry of moving array systems described below.

High-resolution active 3D wideband microwave- or millimeter-wave imaging can be performed by scanning a transceiver over a 2D spatial aperture in front of the imaging target 102. At each aperture position or voxel, the radar transceiver sweeps the frequency driving the transmit antennas and coherently detects the wavefront scattered from the target with the receive antennas. This collected signal is recorded coherently and can be represented by the complex function (or discrete data set), $S(a_1, a_2, f)$ where $a_1$ and $a_2$ are the aperture axes corresponding to the length of the antenna array and the motion of the antenna array during scanning of the aperture, respectively, and f is the frequency of the emitted electromagnetic energy.

Accordingly, in one embodiment, the first and second columns define a first axis of the aperture, the movement of one of the antenna array and the target define a second axis of the aperture, and the transceiver emits the electromagnetic energy having a plurality of different frequencies within a frequency range (e.g., sweeping a plurality frequencies within a desired bandwidth) to define a third axis of the scanned aperture. In one embodiment, the two-dimensional aperture comprises a plurality of voxels and the transceiver controls the antenna array to emit the electromagnetic energy having a plurality of different frequencies for each of the voxels to provide imaging in the third direction (i.e., depth).

A point target has an expected phase response proportional to the frequency and the round-trip range to the target is given by:

$$S(f) = A_0 e^{-j2kr_0} \qquad \text{Eq. 1}$$

where $A_0$ is the received complex amplitude, $r_0$ is the range, $k=2\pi f/c$ is the wavenumber, f is the frequency of the electromagnetic energy, and c is the speed of light.

A full 3D dataset $S(a_1, a_2, f)$ is referred to as the phase-history that is mathematically focused, or reconstructed, in one embodiment to form a high-resolution image of the target using example methods discussed below. The lateral resolution of the image is limited by diffraction and is a function of the wavelength of the illumination as well as the angular extent of the illumination of the target. The angular illumination can be limited by the antenna beamwidth or the extent of the spatial aperture. For a full illumination angular extent of $\theta_b$, the expected lateral resolution is:

$$\delta_{lateral} \approx \frac{\lambda_c}{4\sin(\theta_b/2)} \quad \text{Eq. 2}$$

where $\lambda_c$ is the wavelength at the center frequency. Near-field imaging with an angular extent of 60 degrees yields one-half wavelength resolution. The depth resolution is determined by the bandwidth of the system and is given by:

$$\delta_{depth} = \frac{c}{2B} \quad \text{Eq. 3}$$

where c is the speed of light and B is the bandwidth of the frequency sweep. The combination of wide-beamwidth, large apertures, and large bandwidth allows for high-resolution imaging with resolution on the order of the wavelength in all three dimensions.

For planar, rectangular, and uniformly sampled spatial apertures, images can be reconstructed using techniques based on multi-dimensional Fourier Transforms, as described by Sheen D M, et al., "Three-Dimensional Millimeter-Wave Imaging for Concealed Weapon Detection," *IEEE Transactions on Microwave Theory and Techniques* 49(9): 1581-1592, 2001, the teachings of which are incorporated by reference herein. Another similar algorithm was derived and implemented for cylindrical apertures which uses a cylindrical and uniformly sampled aperture as described in Sheen D M, et al., "Cylindrical Millimeter-Wave Imaging Technique for Concealed Weapon Detection," *In Proceedings of the SPIE: 26th AIPR Workshop: Exploiting New Image Sources and Sensors*, pp. 242-250, Oct. 15, 1997, Washington, D.C., The International Society for Optical Engineering (SPIE), Bellingham, Washington 1998; Sheen D M, et al., "Combined Illumination Cylindrical Millimeter-Wave Imaging Technique for Concealed Weapon Detection," *In Passive Millimeter-Wave Imaging Technology IV, Proceedings of SPIE*, Vol. 4032, pp. 52-60. Apr. 24, 2000, Orlando, Florida, The International Society for Optical Engineering, Bellingham, Washington, 2000; and Sheen et al., "Near-Field Three-Dimensional Radar Imaging Techniques and Applications," *Applied Optics* 49(19):83-E93. DOI: 10.1364/AO.49.000E83, 2010, the teachings of each of which are incorporated herein by reference.

Imaging from complex configurations consisting of non-uniform, non-planar apertures, moving or animated targets, utilizes a more versatile image formation approach in example embodiments described herein. A process to form images from phase-history data that is closely related to how the phase-history data is theoretically formed is discussed in Mensa D L, *High Resolution Radar Cross-Section Imaging*, Norwood, Massachusetts, Artech House, 1991, the teachings of which are incorporated by reference herein.

The phase-history response from a distributed target can be considered to be a summation (or integration) of the reflected response from each point on the target. Each point on the target is assumed to scatter spherically and the received signal is of the form given in Eq. (3.1). In Mensa's "Generalized Focused Imaging" approach, the image is formed by the integrated product of the measured data multiplied by the conjugate phase history postulated for a point located at each pixel in the image space. If there is scattering from a given voxel location, then a component of the phase-history signal will be multiplied by its exact conjugate phase and will integrate in-phase to yield a strong image intensity at that voxel location. The response from scattering at other positions will add out-of-phase and not contribute significantly to the image intensity at that location. This example image reconstruction is referred to as back-projection and can be adapted according to example embodiments described below to focus images from non-uniform apertures of essentially any configuration (e.g., resulting from non-uniform movement of a target or antenna array during scanning operations).

In one embodiment, the full frequency domain back-projection imaging algorithm performs a multi-dimensional matched-filter or correlation operation by summing the product of the radar response (i.e., electromagnetic energy received by the receive antennas) and the conjugate of the expected response from a point scatterer at each voxel location. The summation is performed over all aperture positions and all frequency samples for each voxel location. This approach is modified in the following embodiments to account for independent transmit and receive antenna locations (multistatic aperture scanning), 3D imaging, and moving targets. In particular, the image reconstruction techniques are developed and detailed for several 3D imaging configurations including a scanned spatial aperture via a moving antenna array (FIGS. 12-14) and a moving target stationary antenna array (FIG. 15).

Figure 12:
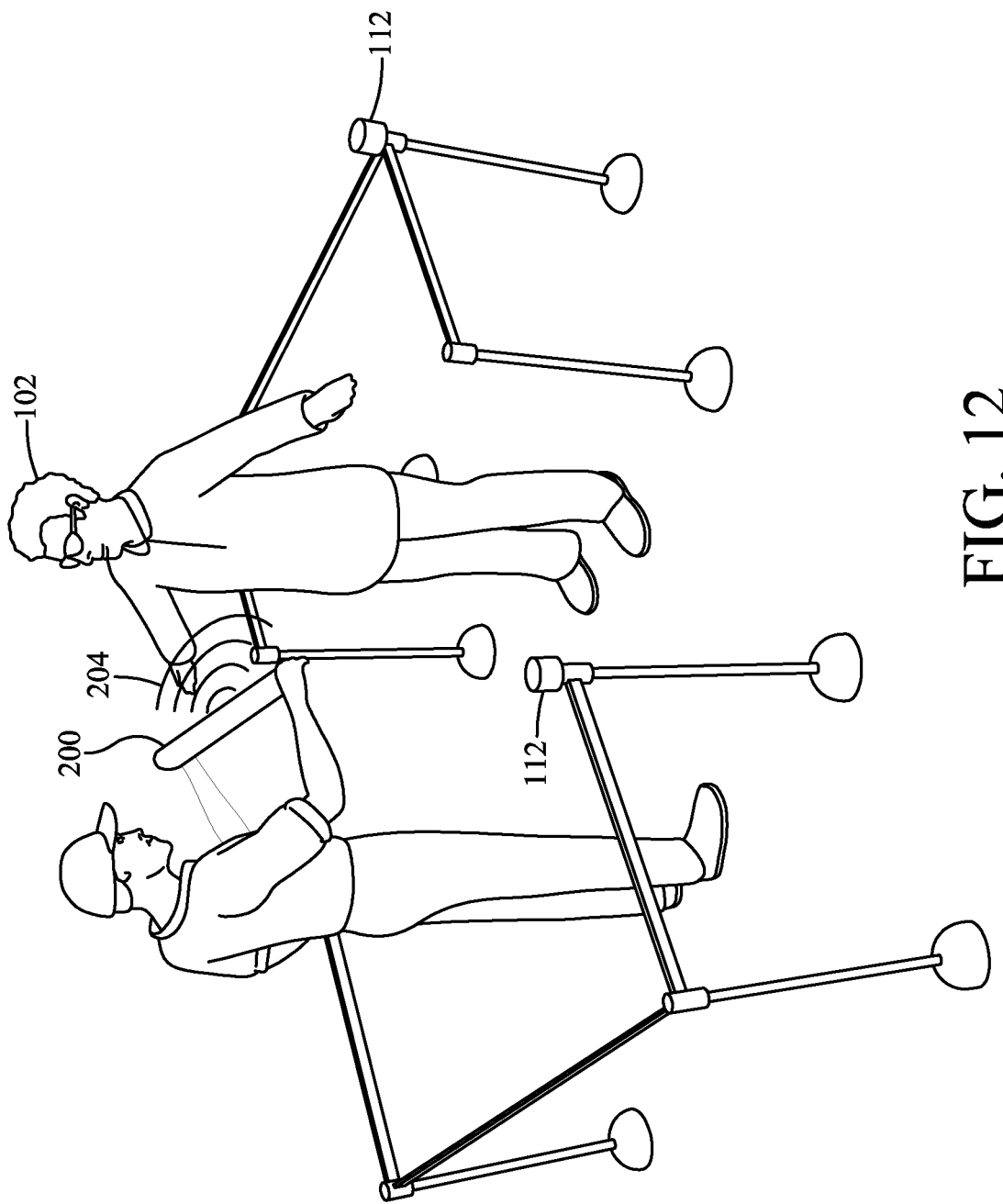
FIG. 12 is an illustrative representation of an imaging system including a moveable scanning device and a stationary target according to one embodiment.

One example implementation of multistatic scanned aperture imaging is shown in FIG. 12 where a moveable scanning device 200 is moved adjacent to a target 102 of interest, such as an individual receiving primary or secondary screening at a public location. In this example, target 102, such as a person, stands in a fixed location as an operator moves the scanning device 200 adjacent to the person to scan for concealed objects on the target 102. In FIG. 12, a plurality of cameras 112 define a perimeter about an area including the target 102 and the cameras 112 capture images of the scanning device 200 and target 102 to monitor positions thereof as the scanning device 200 is moved. The radar data and position data may be processed together to generate accurate images of the target 102 as discussed herein.

Figure 13:
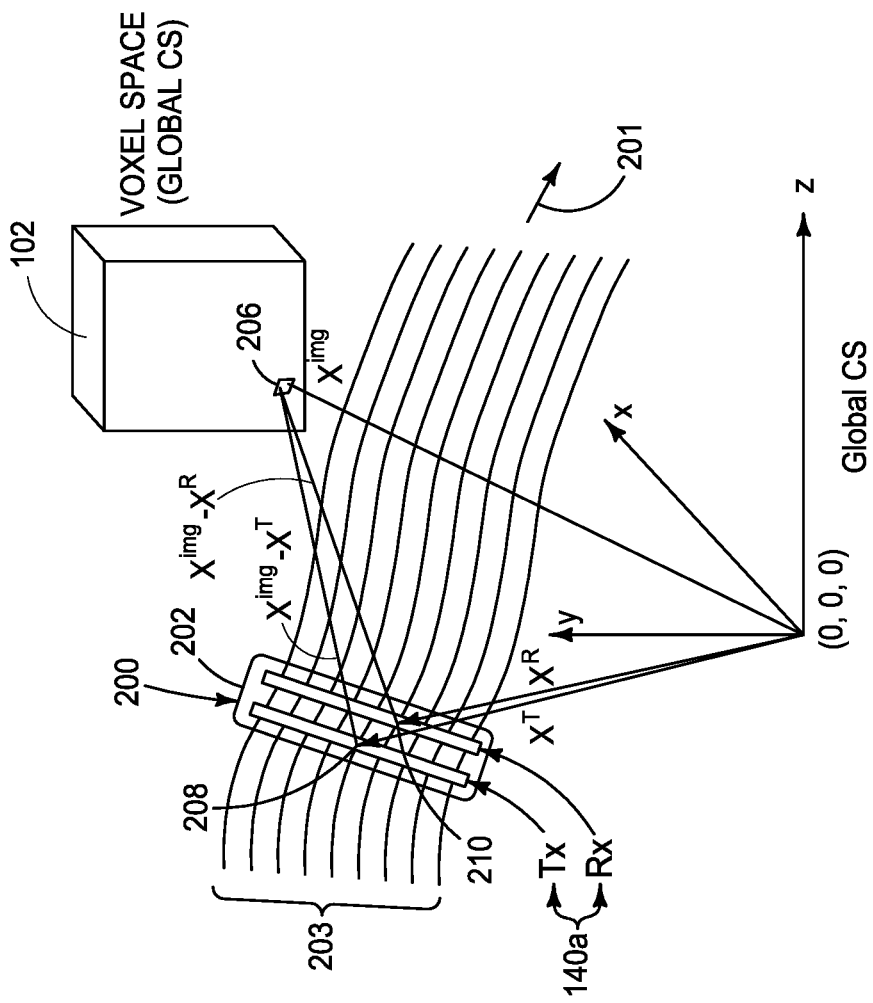
FIG. 13 is an illustrative representation of a multistatic scanned aperture imaging configuration according to one embodiment.

Additional details regarding a multistatic scanned aperture imaging configuration are described with respect to FIG. 13 where a target 102 is at a constant location during a scanning operation while a movable scanning device 200 moves along a motion direction 201 past the target 102. In one embodiment, the scanning device 200 is arranged as a handheld scanning device which may be held and moved by a user or operator to scan people for security or other purposes (e.g., to provide additional individual screening of a person of interest). The scanning device 200 includes a support structure 202, such as a plastic housing, that is configured to support a linear antenna array 140a which may be configured similar to arrangements discussed above with respect to FIG. 1 with a shorter length and reduced numbers of transmit and receive antennas. An example linear antenna array 140a includes a transmit column and a receive column of respective transmit and receive antennas which are arranged along respective axes of the columns (the individual antennae are not shown in FIG. 13).

The illustrated moveable scanning device 200 provides a scanned aperture 203 which consists of transmit and receive combinations of the antenna array 140s whose effective phase center spans the extent of the aperture 203. The transmit and receive antennas are electronically and mechanically scanned over the 2D aperture 203 as the scanning device 200 moves in a direction 201 which is substantially orthogonal to the axes of the transmit and receive columns of antenna array 140a.

Although not shown, scanning device 200 may include additional components of the radar system described above which are configured to control emission of electromagnetic energy via antenna array 140a and processing of signals outputted by receive antennas resulting from electromagnetic energy from target 102. Scanning device 200 may include appropriate communication circuitry to output wireless signals corresponding to received electromagnetic energy, radar data representative of the received electromagnetic energy and/or other information externally from scanning device 200 for processing by a remote computer system to generate images of the target 102 resulting from the scanning by scanning device 200. In some embodiments, the scanning device 200 may include optical markers (not shown) for use in position determination by a position capture system.

It is desirable during scanning to point the antenna array 140a in the direction of the target 102 where electromagnetic energy is emitted from the antenna array 140a towards the target as the antenna array 140a moves past the target 102 and the aperture 203 is scanned. A global coordinate system is used for the processing discussed with respect to the embodiment of FIG. 13 and the coordinate system of the position capture system (not shown) is used as the global coordinate system in one embodiment. The length of the antenna array 140a in a direction orthogonal to the motion direction 201 defines one dimension of the scanned aperture 201 which includes a plurality of voxels 206 (which correspond to 3D pixels). In one example, a scanned aperture may be the size of a cubic meter and include 200×200×200 voxels 206 which are 5 mm on edge.

To perform back-projection focusing, an important parameter is the effective range from a selected pair of transmit and receive antennas to a given image voxel, which is defined here as one-half the round-trip distance. For a single voxel, the frequency-domain back-projection algorithm can be expressed as:

$$v(x^{img}) = \sum_{\substack{aperture \\ \{a_1,a_2\}}} w(a_1, a_2) \sum_f S(a_1, a_2, f) e^{j2kr} \quad \text{Eq. 4}$$

where $v(x^{img})$ is the complex image amplitude or intensity at an image position or voxel $x^{img}$, $S(a_1, a_2, f)$ is the complex radar phase-history data collected over aperture dimensions $(a_1, a_2)$ and f is frequency. An aperture weighting term $w(a_1, a_2)$ is used here to provide amplitude weighting of calculated intensities of the voxels to reduce side lobes or other artifacts in the image and which is discussed in further detail below. Note that S and w are both typically discrete multidimensional arrays rather than continuous functions in one embodiment. The conjugate phase term in this expression is $e^{j2kr}$ where k=2πf/c, c is the speed of light, and $$r = (|x^{img} - x^T| + |x^{img} - x^R|)/2 \quad \text{Eq. 5}$$

In this expression, the transmit location is $x^T$, the receive location is $x^R$, the image voxel location is $x^{img}$, and the round-trip distance is divided by 2 so that the range (r) is an equivalent or "effective" one-way distance to the voxel of the target. This is done for consistency with monostatic or quasi-monostatic radar systems.

For 3D imaging, the above processing has a computational burden of $O(N^6)$ upon the processing circuitry where N is the nominal dimension of each axis of the voxel space, frequency, and aperture dimensions. High-resolution will have N on the order of 100-1000, representing a very large amount of required computation. The order of this process can be reduced to $O(N^5)$ by transforming from the frequency domain to the range domain, as described below.

The summation over frequency in this equation can be computed using the inverse Discrete Fourier Transform (iDFT), which can be performed efficiently using an inverse fast Fourier transform (iFFT) discussed further below. Examining a single aperture position in the above equation, the range response of the summation over frequency is denoted, $$s(r) = \sum_f S(f) e^{j2kr} \quad \text{Eq. 6}$$

Frequency is discretely and uniformly sampled with starting frequency $f_{start}$, and final frequency $f_{stop}$ and N samples. This results in frequency samples of $$f_i = f_{start} + i\frac{B}{N} \quad \text{Eq. 7}$$

where $B = f_{stop} - f_{start}$ is the bandwidth of the frequency sweep. The summation in Equation 6 is very similar to the inverse DFT formula given by $$x_n = \frac{1}{N} \sum_{i=0}^{N-1} X_i e^{j2\pi in/N} \quad \text{Eq. 8}$$

where $x_n$ are the samples in the non-Fourier Domain (e.g., time or space) and $X_i$ are the samples in the Fourier Domain (e.g., frequency or spatial frequency). Using the frequency sampling, the range response in Equation 6 can be cast into this form as $$s(r) = \sum_{i=0}^{N-1} S_i e^{+j2(2\pi f_i/c)r} = \sum_{i=0}^{N-1} S_i e^{+j2(2\pi)(f_{start} + i\frac{B}{N})/c)r} = \quad \text{Eq. 9}$$

$$e^{j2\pi f_{start} r/(c/2)} \sum_{i=0}^{N-1} S_i e^{+j2\pi \frac{B}{N} i \frac{r}{c/2}} = e^{j2k_1 r} \sum_{i=0}^{N-1} S_i e^{+j2\pi \frac{B}{N} i \frac{r}{c/2}}$$

where $k_1 = 2\pi f_{start}/c$ is the wavenumber at the start frequency.

This result is very close to the form of the inverse DFT equation. The exact form can be obtained if the range is restricted to discrete integer multiples of the range resolution, c/2B, or $r_n = nc/2B$, which yields, $$s(r_n) = e^{j2k_1 r_n} \sum_{i=0}^{N-1} S_i e^{j\frac{2\pi i n}{N}} \qquad \text{Eq. 10}$$

$$= e^{j2k_1 r_n} iDFT(\{S_i\})_n$$

This result shows that the range response can be obtained by the product of a simple phase factor and the nth component of the iDFT (or iFFT).

Therefore, a simple phase correction after the iDFT provides the same result as the frequency summation in the back-projection process, but allows the use of the highly efficient FFT algorithm compared with the correlation used in the frequency-domain summation in Equation 4.

In practice, the range response will be obtained at any desired range using linear, or other, interpolation. The continuous range response obtained using an interpolation process is denoted as $$s(r) = \{s(r_n)\}|_r \qquad \text{Eq. 11}$$

and can therefore be saved as a discrete set of samples and used as a continuous function. Practical use of the range response in Equation 10 reveals that it has a fast phase variation of $e^{j2k_c r}$ where $k_c = (k_1 + k_2)/2$ is the center wavenumber and $k_2 = 2\pi f_{stop}$ is the final wavenumber. Since the range response is queried during summation using interpolation, this phase variation may lead to errors or require that the range response be overly finely sampled. Since the phase variation is known, it can be removed by demodulating it, or multiplying by $e^{-j2k_c r}$. Therefore, the desired slowly varying range response is given by $$s(r_n) = iFFT(\{S_i\})_n e^{j2k_1 r_n} e^{-j2k_c r_n} \qquad \text{Eq. 12}$$

where the iDFT is computed using the iFFT.

Because this demodulation term was introduced for convenience, it will have to be compensated for in the image reconstruction, by re-modulating with $e^{j2k_c r}$.

Using the demodulated range response defined in Equation 12 and the assumed interpolation defined in Equation 11, the complex image amplitude or intensity $v(x^{img})$ at an image position or voxel $x^{img}$ of the range domain back-projection can be expressed as, $$v(x^{img}) = \sum_{\substack{aperture \\ \{a_1, a_2\}}} w(a_1, a_2) s(a_1, a_2, r) e^{j2k_c r} \qquad \text{Eq. 13}$$

where $$s(a_1, a_2, r) = \{iFFT(S(a_1, a_2, f)) e^{j2k_1 r_n} e^{-j2k_c r_n}\}|_r \qquad \text{Eq. 14}$$

is the demodulated range response computed by performing an iFFT of the phase history on the frequency axis, applying a phase term of $e^{j2klr} e^{-j2k_c r}$, and using interpolation (usually linear) to compute the value at range r, which is $$r(|x^{img} - x^T| + |x^{img} - x^R|)/2 \qquad \text{Eq. 15}$$

The complete image is formed by evaluating Equation 13 over the full 3D set of voxel locations and the overall order of the computation performed by the processing circuitry is reduced from $O(N^6) \to O(N^5)$.

As discussed above, generalized frequency domain reconstruction techniques have been extended to operate in the range domain and to allow independent transmitter or receiver locations to be used. The example range domain implementation described herein in one embodiment uses the Fast Fourier Transform (FFT) to dramatically improve the computational efficiency compared to a frequency domain implementation.

The aperture-weighting term $w(a_1, a_2)$ used in the image reconstruction formulas Equation 4 and Equation 13 can be used to control side lobes and reduce blurring in generated images. For example, while scanning an aperture, the movement of the antenna array or target may not be uniform and which may result in some parts of a target being sampled for a longer duration compared with other parts of the target or perhaps the movement of the antenna array may be temporarily reversed resulting in an aperture with a folded back region (and which is scanned multiple times). Accordingly, intensities of the received electromagnetic energy may be erroneously indicated where the scanning for a longer duration occurs or the direction of the movement of the antenna array during scanning is reversed.

For scanned apertures, a Hamming, Hanning, Kaiser, or other window function could be applied to each aperture dimension of the data, $S(a_1, a_2, f)$, to control side lobes. Windowing the data along the frequency axis will control side lobes in the range direction. This works well for apertures that are sampled uniformly, and have smooth regular shapes, such as planar or cylindrical apertures. However, detailed numerical simulations using this image reconstruction technique revealed that the image reconstruction may include significant focusing artifacts for non-uniformly scanned apertures. These artifacts can appear as a low-level background haze in the image, or as more specific correlated artifacts, depending on the nature of the non-uniformity. Note that the frequency axis can usually be sampled uniformly, therefore, conventional windowing works as expected.

It was observed that the artifacts were most significant in apertures in which the spatial sampling density was most highly varied (i.e., densely sampled in some areas and more sparsely sampled in others). The artifacts persisted when the aperture was sampled well below the Nyquist sampling minimums.

At least some of the embodiments of the disclosure are directed towards arrangements which perform 3D imaging using 2D apertures, therefore, summation over the two apertures should be made to approximate surface integration. The aperture weighting term may be set as $w(a_1, a_2) = \Delta a$ where $\Delta a$ is the differential area defined by the aperture position and its nearest neighbors.

However, since the movement of the antenna array or target may not be uniform, there may be cases where the aperture includes folded regions (i.e., in situations where the antenna array or target moves backwards from a main direction of movement while scanning), or may have regions whose normal is not oriented towards the imaging target.

In one embodiment, defining a preferred imaging direction effectively handles extreme aperture non-uniformities, such as when the scanned aperture retraces a region of the aperture, or effectively folds back on itself. Using the preferred direction of the target allows use of a dot-product with the aperture surface normal to define the correct sign of the differential area as discussed below in one embodiment.

Figure 14:
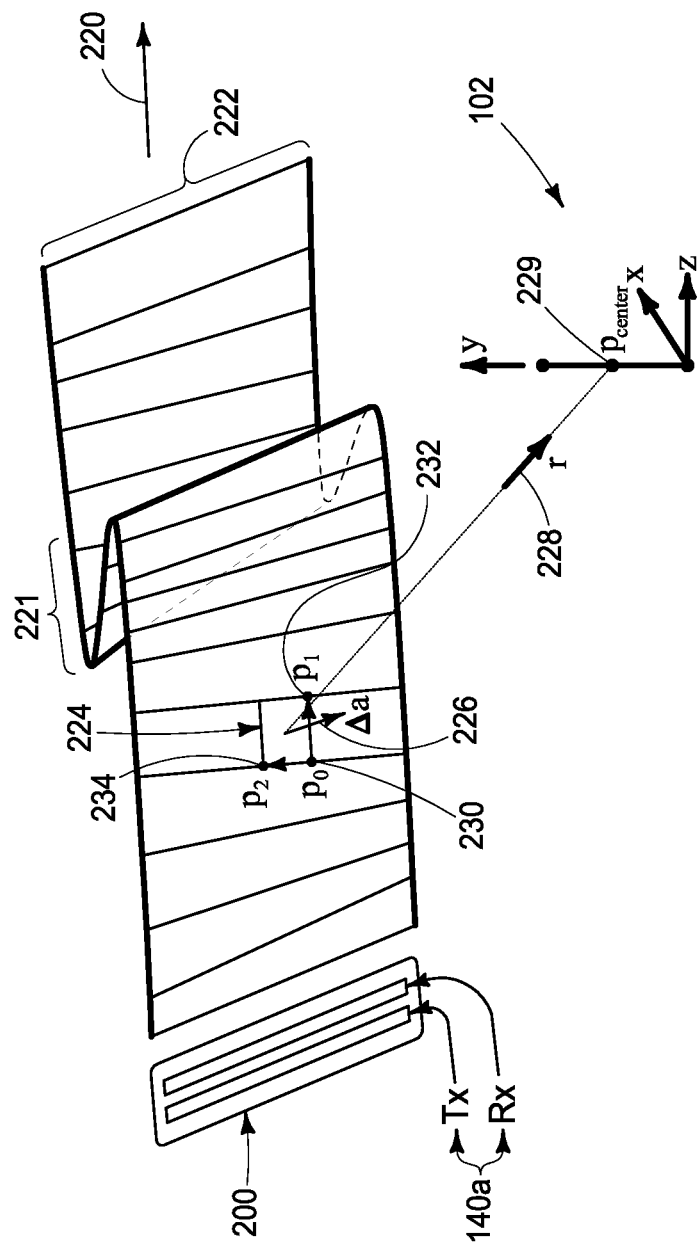
FIG. 14 is an illustrative representation of an aperture weighting configuration having a non-uniform scanned aperture according to one embodiment.
Figure 15:
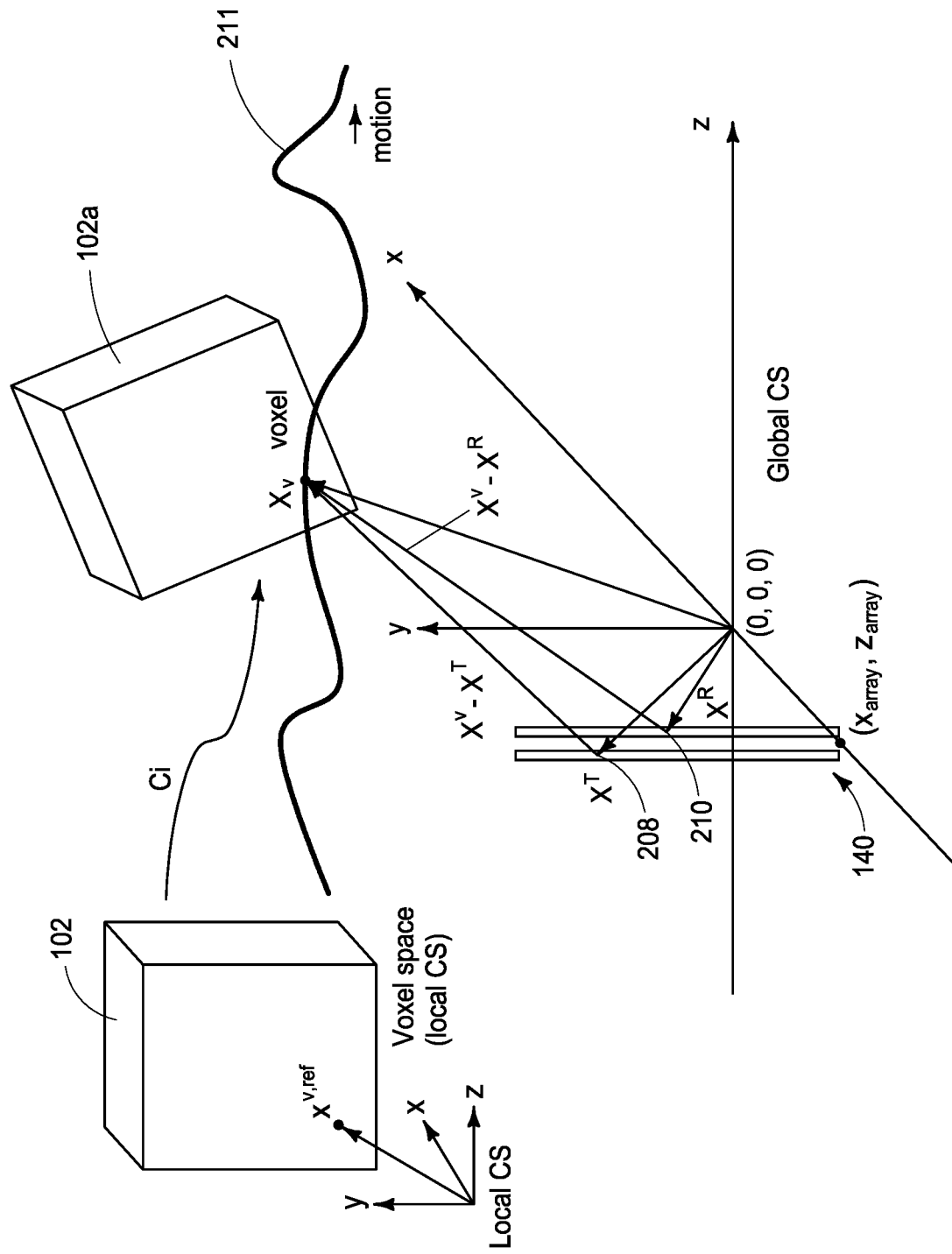
FIG. 15 is an illustrative representation of a configuration for 3D imaging of a moving target in front of a fixed multistatic array according to one embodiment.

Referring to FIG. 14, one example implementation of aperture weighting is discussed for use in applications having a highly non-uniform aperture 222 which is scanned by a moving antenna array. A moveable scanning device 200 includes an antenna array 140a including a first column of transmit antennas and a second column of receive antennas. The center of the target 102 is shown in FIG. 14 as $p_{center}$ at a point 229 in space. The target 102 is stationary and positioned at the same location during the movement of the scanning device 200 and the antenna array moves with respect to the target 102 between at least some of the moments in time. In particular, the scanning device 200 moves along a scanned path 220 in general to the right except for a region 221 wherein the scanned aperture 222 folds back on itself. The scanning device 200 is held in an orientation by the user during scanning of aperture 222 where the axes of the columns of transmit and receive antennas of antenna array 140a are substantially orthogonal to the direction of movement of scanning device 200 in one embodiment.

In one embodiment, the aperture weighting approximates integration of a differential area 224 that is projected towards the image scene center (e.g., point 229 of target 102) during movement of device 200 in the described example. The differential area 224 differs in size as a result of non-uniformities of movement of the antenna array during scanning of the aperture 222. In FIG. 14, a first sample location 230 of the scanned aperture 222 and an adjacent second sample location 234 of the scanned aperture 222 are shown at a first moment in time where the first and second sample locations 230, 234 correspond to effective sample locations of two pairs of Tx/Rx antennas of the antenna array 140a. The effective sample locations are the phase centers (midpoints) between the positions of the transmit and receive antennas of a given pair which generate the sample. Another sample location 232 is shown at a second moment in time after the first moment in time as a result of movement of the antenna array 140a and the respective Tx/Rx pair of antennas which provided the sampling at sample location 230 at the first moment in time. Accordingly, in the described embodiment, the spacing of sampling locations which are adjacent to one another along the antenna array provides a first axis of the differential area 224 and movement of the antenna array between different moments in time provides a second axis of the differential area 224.

In one implementation, the processing circuitry determines the differential area 224 using a plurality of effective sampling locations which are adjacent to one another within the antenna array 140a and which are sampled at different moments in time as shown in FIG. 14. The differential area 224 defined by the different positions of the adjacent sampling locations of the antenna array 140a at first and second moments in time is used to weight the radar data as discussed below.

Projecting the differential area 224 towards the scene center can be accomplished by setting the aperture weighting to $$w(a_1, a_2) = \Delta a \cdot \hat{r} \qquad \text{Eq. 16}$$

where $\Delta a$ is the vector differential for the aperture sample at aperture axes $(a_1, a_2)$ and $\hat{r}$ is a unit vector 228 directed from the sample position to the scene center $p_{center}$ 229.

For the configuration in FIG. 14, $$\Delta a = (p_1 - p_0) \times (p_2 - p_0) \qquad \text{Eq. 17}$$

where $p_0$ is the position vector to $(a_1, a_2)$, $p_1$ is the position vector to $(a_1+1, a_2)$, $p_2$ is the position vector to $(a_1+1, a_2+1)$, and $\hat{r} = (p_{center} - p_0)/|p_{center} - p_0|$. The cross product of a first vector from $p_0$ to $p_1$ and a second vector $p_0$ to $p_2$ yields a vector 226 of the differential area 224 which is normal to the surface differential area 224.

This aperture weighting properly handles significant aperture non-uniformities, including re-scanning an area of the aperture. As mentioned above, the illustrated aperture 222 includes a region 221 where the aperture 222 folds back upon itself. Due to the fold, region 221 is effectively scanned three times. However, the example aperture weighting described above will be positive for two of these regions and negative for one, so the final result represents the non-redundantly scanned area in region 221. More specifically, in Equation 16 discussed above, when the array 140a moves in the motion direction 220, the direction of the vector differential 226 is mostly aligned with the direction of the unit vector 228 and the dot product of the weighting in Equation 16 provides positive output values while the dot product provides negative output values when the array 140a moves in a direction backward or opposite to motion direction 220 since the vector 226 is mostly opposite to the direction of unit vector 228. Accordingly, in FIG. 14, two sets of positive output values and one set of negative output values are generated for the folded region 221 as a result of the weighting and the set of negative output values cancels one of the sets of the positive output values yielding accurate results based upon one set of the positive output values for the folded region 221 as opposed to two or more sets of output values which would otherwise indicate erroneous intensity data in the folded region 221.

A Hamming window function is applied to the data along the aperture and frequency dimensions to reduce side lobes in the lateral and depth dimensions in some embodiments. Spatial windowing can be added to the above aperture weighting function and the frequency windowing may be added to the range response calculation (i.e., multiplied prior to performing the iFFT).

Accordingly, appropriate processing circuitry is configured to access the radar data at a plurality of moments in time and position information that is indicative of movements of the antenna array 140a (or the target for example as discussed with respect to FIG. 1) at the respective moments in time. The processing circuitry uses the position information regarding the scanning device 220 to weight the radar data before the generation of images of the target in one embodiment discussed above that removes anomalies caused by a non-uniformly scanned aperture 222. In the example embodiment discussed above with respect to FIG. 14, the processing circuitry determines unit vector 228 from the antenna array 140a to the target 102 at different moments in time, uses position information of the effective sampling locations of the array 140a to determine differential area 224 having differential vector 226 at the different moments in time, and uses the differential area 224, the differential vector 226 and the unit vector 228 to weight the radar data.

In one embodiment, the processing circuitry is configured to implement weighting using the calculated differential areas and differential vectors by weighting an intensity of the radar data an increased amount at one of the moments in time compared with another of the moments in time as a result of the motion information indicating an increased amount of movement occurring at the one moment in time compared with the another moment in time according to the differential area calculation of Equation 17.

Through the use of the dot product of equation 16 and the differential vector 226 and unit vector 228, one embodiment of the processing circuitry is configured to use the motion information to positively weight the radar data at one moment in time as a result of the position information indicating one of the movements of the antenna array 140a in a first direction at the one moment in time and to use the position information to negatively weight the radar data at another moment in time as a result of the position information indicating another of the movements of the antenna array 140a in a second direction opposite to the first direction at the another moment in time.

The discussion continues below with respect to example embodiments that implement imaging of contents of a target moving past a stationary antenna, for example as discussed above with respect to FIG. 1. A moving target allows 3D imaging to be performed by using the target motion to effectively scan one or more axes of an equivalent aperture. A linear array can then be used to form an orthogonal axis of the aperture. For example, nominally linear motion in front of a fixed linear array creates an equivalent rectangular aperture in which one axis is scanned electronically by the array and the other axis is scanned by target motion. Another example is rotating a target in front of a linear array.

One embodiment for implementing 3D imaging of a moving target 102 in front of a fixed multistatic array 140 is shown in FIG. 15. A moving target 102 is shown at a first spatial location at a first moment in time and as target 102a at a second spatial location at a second moment in time as a result of movement of the target between the first and second moments in time.

The motion of the target is described by assuming rigid-body motion consisting of 3D rotation and translation in one embodiment. In Cartesian coordinates, rotation is performed conveniently using 3×3 matrix multiplication, and translation is performed by adding a 3-vector. The use of homogeneous coordinates allows these operations to be combined into a single 4×4 coordinate transformation C.

The new position of a voxel of the target can then be described by simple matrix multiplication $x^v = C \cdot x^{v,ref}$ where $x^v$ is the position vector in the new motion frame and $x^{v,ref}$ is the voxel position in the reference frame which is local to and attached to the target. Motion over a complete set of frames can then be described by a set of homogeneous coordinate transformation matrices $C_i$ where i is the motion index spanning the full set.

Backprojection can be performed similarly to the scanned aperture imaging configuration discussed above, and an important parameter is again the effective range from the target voxel to the T/R antenna pairs of the antenna array 140. In FIG. 15, the antenna array 140 is defined with reference to a global coordinate space while voxels of the target are in a local coordinate space. In one arrangement, voxel locations are transformed into the global coordinate system and summation is performed upon the data in the global coordinate system.

The complex image amplitude at a point rigidly connected to the target is:

$$v(x^{v,ref}) = \sum_{motion, a_1} \sum_{array, a_2} w(a_1, a_2) s(a_1, a_2, r) e^{j2k_c r} \qquad \text{Eq. 18}$$

which is essentially the same formula used for scanned aperture embodiments (i.e., equation 13 above), although differing in the separation of the summation into motion ($a_1$) and array ($a_2$) components and in the distance (r) calculation which accounts for the motion of the target. In Equation 18, the effective distance from one pair of T/R antennas to the voxel is $$r = (|x_v - x^T| + |x_v - x_R|)/2 \qquad \text{Eq. 19}$$

where $$x^v = C_i x^{v,ref} \qquad \text{Eq. 20}$$

and $x^{v,ref}$ is the voxel location in the local (or reference) coordinate system for the target and $x^v$ is the voxel location in the global coordinate system.

Aperture weighting for the moving target imaging method can be calculated using an equivalent spatial aperture, which is the aperture obtained by mathematically assuming the target is stationary and the array is moving. The equivalent aperture shape or positions are obtained by expressing the array coordinates in a coordinate system (CS) local to the moving target, which is obtained by multiplying the array coordinates by $C_i^{-1}$ and then evaluating the aperture weighting using Equation 16.

Application of the above-described image reconstruction technique uses position information of the moving target at different moments in time and an optical position capture system described above may be utilized in some embodiments to generate position and/or motion information regarding the moving target. Accordingly, the target and antenna array may both include a plurality of markers as discussed with respect to FIG. 11.

For one implementation of image reconstruction, an accurate estimation of the homogeneous coordinate transformation $C_i$ is used. This homogeneous coordinate transformation (CT) can be decomposed into a 3D rotation matrix and a 3D translation. Rigid-body motion estimation can be done using two sets of measured marker positions with known correspondences and is referred to as the absolute orientation problem in computer or machine-vision applications.

One method which may be used is discussed in Horn BKP, "Closed-Form Solution of Absolute Orientation Using Unit Quaternions," *Journal of the Optical Society of America A* 4(4):629-642 1987, the teachings of which are incorporated herein by reference. This method solves for the optimal rotation matrix and translation that maps a set of points (marker positions) from one position to another. The optimal rotation provides the least-squares error between the marker positions transformed from their original position and the markers measured in their new position. The rigid-body estimation in this case minimizes the difference between the transformed version of the markers at the reference position and the measured version of the markers in their new position.

The above-described imaging systems generate and display visual images of targets being scanned. In an example security screening application, for example in use at an airport, targets in the form of people walk or move adjacent to stationary antenna arrays to implement scanning of the target. The imaging system processes the radar data resulting from the scanning and the position or motion information resulting from movement of the target during the scanning to focus the radar data and use the focused radar data generate accurate images of the targets being scanned. In the example security screening application, bodies of the people being scanned are displayed along with concealed objects on their person due to the objects reflecting the electromagnetic energy which was emitted from the antenna arrays.

Some aspects of disclosure are discussed above in example implementations where an antenna array moves along a path to scan an aperture about a stationary target (e.g., the handheld scanning embodiment discussed with respect to FIG. 13 above). In other aspects of the disclosure, an antenna array may be associated with a moveable vehicle, such as an unmanned aerial vehicle (UAV) or ground-traversing vehicle, and uses to emit electromagnetic energy which is reflected by objects which are buried in the ground or placed behind or within walls of a structure. The reflected electromagnetic energy and position information of the vehicle (and antenna array) are used to generate images of the concealed objects which are not otherwise visible.

Figure 16:
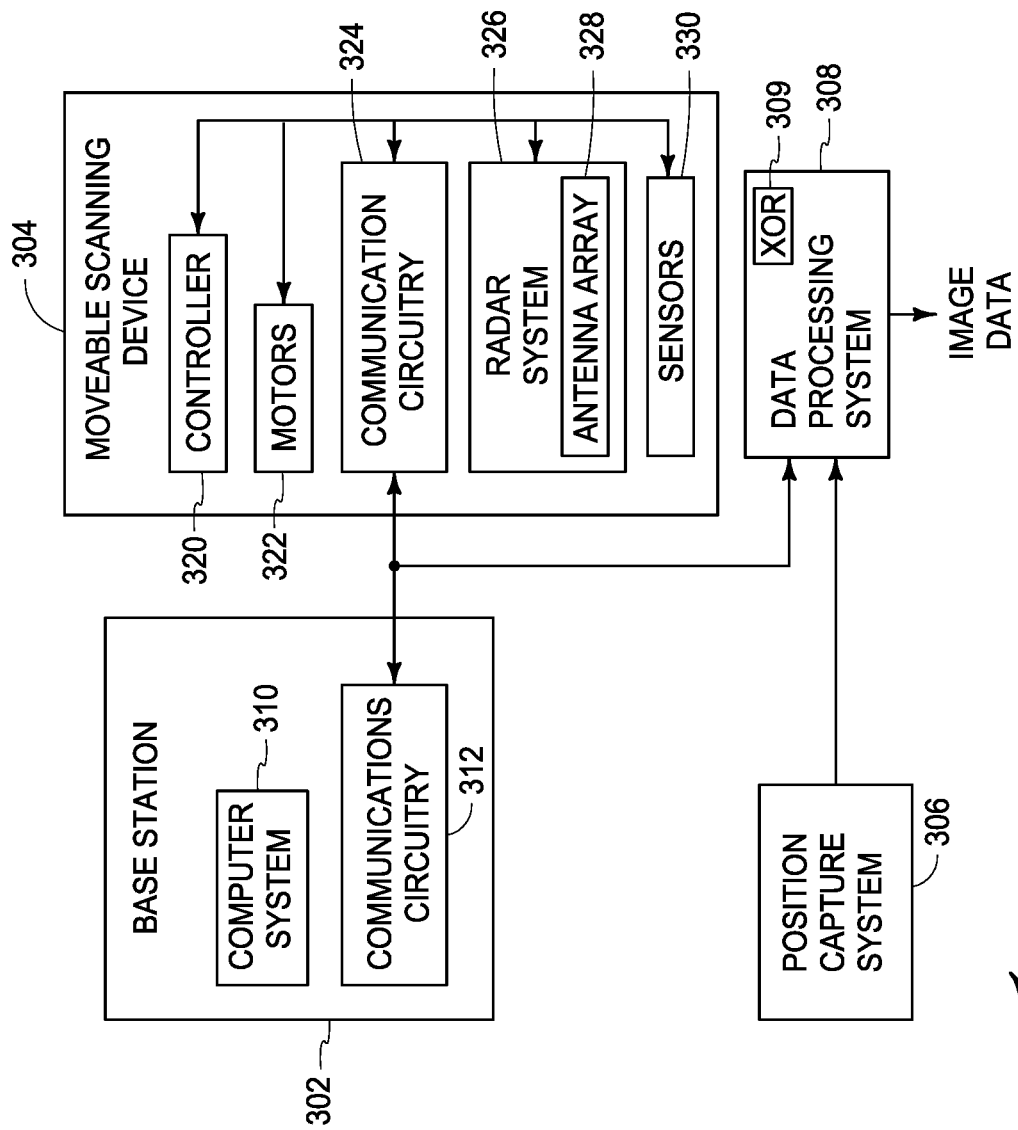
FIG. 16 is a functional block diagram of an imaging system having a moveable scanning device according to one embodiment.

Referring to FIG. 16, an imaging system 300 including an antenna array mounted upon a movable scanning device 304 is discussed in one embodiment. The movement of the device 304 is used to scan one axis of the aperture and the antenna array installed upon the device 304 defines a second axis of the scanned aperture (e.g., along the length of a linear antenna array) similar to the discussion above. In addition, the frequency of the electromagnetic energy emitted from the antenna array may be scanned over a bandwidth to enable formation of images along a third axis (i.e., depth of a target).

The depicted imaging system 300 includes a base station 302, moveable scanning device 304, position capture system 306 and data processing system 308. FIG. 16 depicts one example implementation of imaging system 300. In other embodiments, one or both of position capture system 306 and data processing system 308 may also be implemented within base station 302, or some components of position capture system 306 may be implemented within the vehicle 304. In addition, base station 302 may also be omitted and systems 306 and 308 may also be implemented within device 304 in other possible embodiments.

Base station 302 supports, monitors and controls the operation of the scanning device 304 and includes a host computer 310 and communications circuitry 312 in the illustrated embodiment. The host computer 310 includes appropriate processing circuitry to execute programming (e.g., software) to control communications with and operations of scanning device 304. For example, base station 302 can control movement of scanning device 304, including for example different flight modes if scanning device 304 is implemented as a UAV described below. Communications circuitry 312 utilizes a telemetry radio link to implement wireless communications with scanning device 304 in the described embodiment.

In one embodiment, computer system 310 provides the ability to use pre-programmed paths of movement of the device 304 and the device 304 can be controlled to move by GPS coordinates or relative position change from home to a specific location and perform 3D microwave or millimeter-wave imaging operations.

The moveable scanning device 304 includes a controller 320, one or more motors 322, communication circuitry 324, radar system 326 and one or more sensors 330 in the illustrated embodiment. Although not shown in FIG. 16, moveable device 304 may include an appropriate power source (e.g., Lithium battery) to provide operational energy to the components of the scanning device 304.

In one embodiment, the moveable scanning device 304 is used as a platform for scanning the radar system 326 over a targeted aperture in order to collect radar data which is focused using position information of the device 304 and antenna array thereof enabling the formation of accurate 3D microwave or millimeter-wave images.

The controller 320 translates commands from base station 302 into controls of motors 322 for accurate movement and stability of scanning device 304 while moving within an area of interest. Communications circuitry 324 implements wireless communications with respect to base station 310 including receiving commands which control movement of scanning device 304 and scanning operations of radar system 326. In one embodiment, the radar system 326 includes a high frequency transceiver, switching matrix, antenna array, control electronics and data acquisition system (DAQ) similar to the embodiment discussed above with respect to FIG. 1.

The radar system 326 transmits electromagnetic energy (waves) into a scene in order to ascertain information regarding targets of interest within the scene and which are invisible to view, such as objects buried within the ground or placed within or behind walls in illustrative examples. Transmit antennas within the array 328 direct the electromagnetic signals to the area of interest where they reflect off of materials based upon their material properties and the angle of incidence according to Snell's Law.

In one embodiment, the transceiver is implemented as a frequency modulated continuous wave (FMCW) single-sideband upconvert heterodyne system which controls the emission of electromagnetic energy sweeping through a bandwidth of approximately 12-18 GHz in one embodiment. An output of a 12-18 GHz frequency source is amplified and sent to antenna array 328 and the output of the frequency source is also locally mixed with a 70 MHz reference oscillator which creates a 12-18 GHz+70 MHz reference.

The transceiver is configured to receive signals from the receive antennas corresponding to the received electromagnetic energy. In one more specific example, the electromagnetic energy reflected from the target is received by the receive antennas of array 328 and signals therefrom are down-converted to lower frequencies within the transceiver and the low frequency signals are then sampled and digitized in the data acquisition system to generate radar data which is focused using position information regarding the array 328.

In one more specific embodiment, the reference signal is mixed with the time delayed version of the 12-18 GHz signals that progress through the antenna array 328 and interact with targets in the scene. This time delay creates a difference frequency ($f_d$) which is based upon the sweep rate T of the 12-18 GHz transceiver bandwidth and downrange distance to the target. When mixed at the receive mixer, the resulting signal is 70 MHz+$f_d$ which is filtered and coherently mixed down with the 70 MHz reference in quadrature using an IQ mixer to $f_d$. The full span of difference frequencies over the different target ranges is termed the baseband frequency range and these baseband frequencies are then sampled and digitized in the data acquisition system providing the radar data.

The digitized signals including the radar data from radar system are sent via communication circuitry 324 to communication circuitry (not shown) of data processing system 308. The position information from system 306 indicative of the position of the device 304 is also communicated to system 308. Appropriate processing circuitry 309 of system 308 processes the position information and radar data corresponding to the electromagnetic energy received by the radar system and generates image data therefrom of the target being scanned. In one embodiment, the processing circuitry 309 uses position information from position capture system 306 to focus the radar data using data processing techniques discussed above to create 3D microwave or millimeter-wave images. The generated image data is used to generate images of the target using an appropriate display device.

In some implementations, radar system 326 includes a switching matrix to distribute the 12-18 GHz frequency sweep throughout the array in a sequenced manner similar to some of the embodiments discussed above. During a 12-18 GHz sweep only a single transmit and receive antenna pair is selected at a time creating one virtual element. This architecture activates only a single virtual element but other architectures supporting multiple active transmitters and receivers, phased arrays or digital beam forming networks are also applicable.

Figure 17:
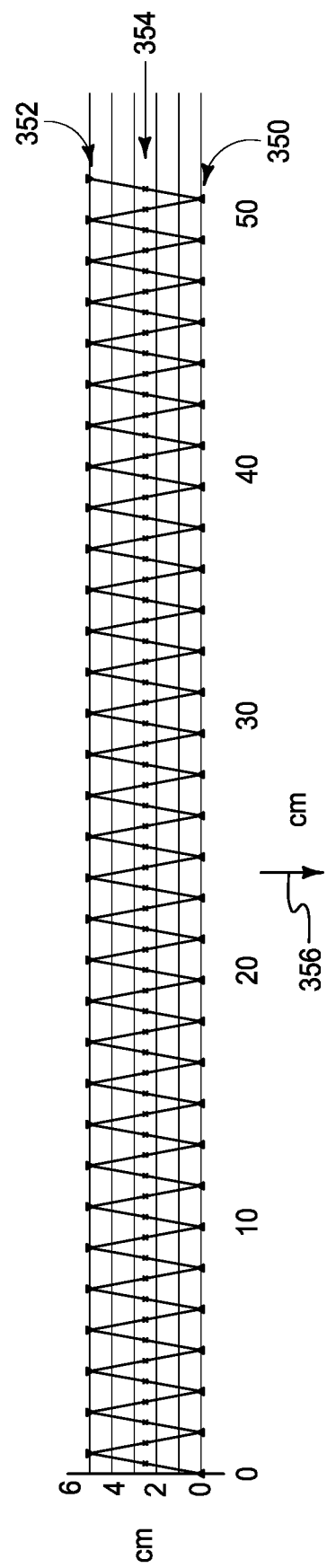
FIG. 17 is an illustrative representation of an antenna array of a moveable scanning device according to one embodiment.

One example of antenna array 328 is a linear antenna array having staggered antennas is shown in FIG. 17. A plurality of transmit antennas are arranged in a first column 350, a plurality of receive antennas are arranged in a second column 352, and a plurality of sampling locations are provided by different Tx/Rx pairs in a third parallel column 354. The transmit antennas and the receive antennas are staggered with respect to one another in the illustrated example. In one embodiment, a direction of movement 356 of the scanning device 304 during scanning occurs in a direction which is substantially orthogonal to the columns 350, 352, 354. The illustrated antenna array 328 has a length of 50 cm and includes 32 transmit antennas and 32 receive antennas, although 2D arrays, single element systems or other linear arrays may also be used.

The antenna gain directly influences signal to thermal noise ratio (SNR) and the illustrated antenna array of FIG. 17 has a 60-degree 3 dB beam pattern to provide illumination of targets over wide angles thereby providing wide angle exposure on a target for the focusing algorithms. The antennas achieve a 60-degree 3 dB beam pattern in both the phi and theta planes causing the antennas to have a wide angle of illumination of targets in the scanned aperture. The antennas are also designed to have a boresight gain of 5 dBi, decibels relative to isotropic radiation, or higher.

Controller 320 includes control electronics and data acquisition that control the RF sweep, provide logic mapping to virtual elements, synchronize ADC sampling with the RF sweep, and exportation of IQ waveforms. In one embodiment, the architecture sequentially switches throughout the antenna array to each virtual element (e.g., effective sampling location of a selected T/R pair) wherein a full radar frequency sweep is performed before sequencing to the next virtual element. The radar circuitry 326 generates the baseband IQ signals and samples and digitizes them using an analog to digital converter (ADC). An advanced reduced instruction set computing (RISC) machine (ARM) processor is used for data acquisition control parameters and exporting the data to the data processing system 308 via the communication circuitry 324 in one embodiment.

Position capture system 306 generates position information of the moveable scanning device 304 during movement and scanning of the device 304 within an area of interest to be scanned. In one more specific embodiment, the position capture system 306 determines 3D position information of the device 304 over time to synchronize the position of the scanning device 304 (and antenna array 328) with the radar data.

In one embodiment, the position tracking requirements of the radar system are determined by a percent phase error of the highest frequency used and in general a position accuracy of at least $\lambda/10$ is used. It is desired to provide calibrated, low noise and accurate position and rotation information to achieve optimal performance of the imaging and to reduce constant, random, and drifting phase errors.

Figure 18:
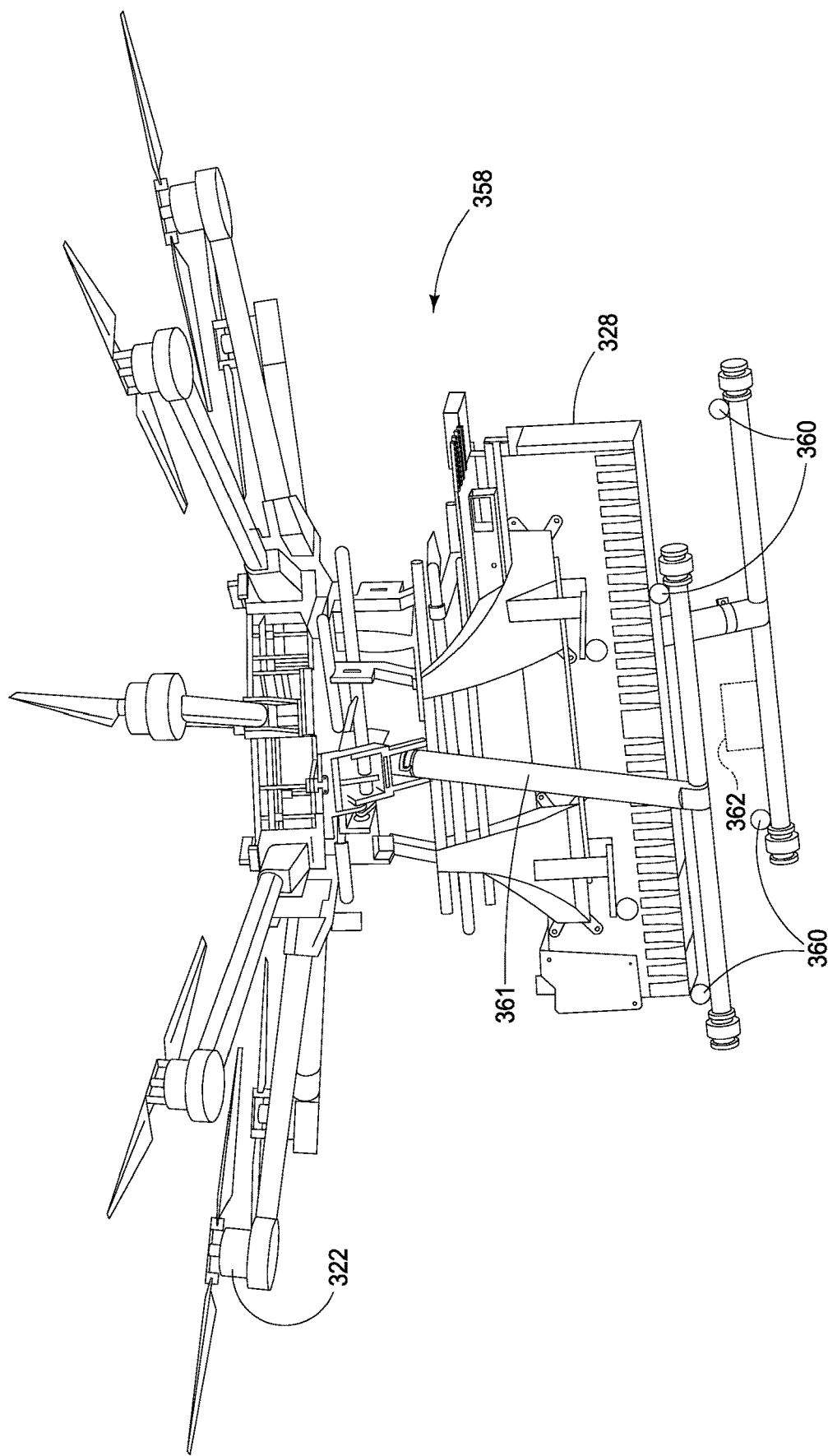
FIG. 18 is an illustrative representation of an unmanned aerial vehicle (UAV) according to one embodiment.

The position capture system 306 may be implemented differently in different embodiments. In one embodiment, the system 306 is external of the moveable scanning device 304 as shown in FIG. 16 and may include an optical position capture system and the cameras thereof may be positioned to capture images of scanning device 304 moving through an area of interest being scanned by the moveable scanning device 304, for example, moving above a roadway enabling scanning and imaging of targets buried below the roadway or moving adjacent to a building wall enabling scanning and imaging of targets concealed behind or within the building wall in illustrative examples and which are similar to the embodiment described with respect to FIG. 11. A plurality of external cameras of the system 306 may capture images of the device 304 (which may include plural markers as shown in the example of FIG. 18) and determine position information regarding the device 304 therefrom.

In another embodiment, the system 306 is implemented using components which are both on-board and external of device 304 and the system 306 may also be implemented entirely using sensors 330 on-board the device 304 in yet an additional embodiment.

Example implementations of sensors 330 that can be employed to obtain 3D position and rotation information of the scanning device 304 include 3 sets of inertial measurement units (IMUs) for redundancy within a UAV flight controller such as the Pixhawk 2 available from Holybro, a LIDAR system developed by Lightware Technologies for accurate elevation measurements providing elevation accuracy to the +/−2 cm level, ultrasonic sensors, and optical odometry. In addition, UAVs often produce 3D position and rotation information from a culmination of the position sensors fused in an internal Extended Kalman Filter (EKF). Alternatively, an Optical Flow sensor is used which captures pictures at very high frame rates and performs rapid 2D phase-only correlations of the images at 400 Hz that are used in conjunction with an elevation sensor to allow for change in 2D lateral space to be determined in real time.

The sensor information relayed to the base station 302 through the telemetry link from the device 304 may include the position: roll, pitch, yaw in degrees, height, and XYZ relative to home, where the home position of the device 304 may be explicitly set by the user.

The accuracy of the position and rotation information used for generating accurate images depends upon the application. For example, position information from sensors 330 may be used in low frequency radar operations (e.g., <1 GHz) for ground penetrating radar (GPR) applications. For high frequency applications, such as in the ku-band of approximately 12-18 GHz, position accuracy requirements are on the order of 2 mm and optical tracking techniques such as marker based, optical position capture, tracking on the device 304, feature tracking in the scene, or optical odometry are used to provide precision for accurate image generation. Details regarding optical odometry are described in Nister, D. et al., Visual Odometry for Ground Applications, *Journal of Field Robotics*, 23(1), 3-20, 2006, the teachings of which are incorporated by reference herein, and details regarding optical position capture are described in Gutemberg B. Guerra-Filho, Optical Motion Capture: Theory and Implementation, *Journal of Theoretical and Applied Informatics (RITA)*, vol. 12, pp. 61-89, 2005, the teachings of which are incorporated by reference herein.

In one embodiment, an optical tracking position capture system tracks markers planted on the moveable scanning device 304 in a calibrated 3D space with multiple high-speed cameras. The cameras track the position of each marker planted on the scanning device 304 over time providing XYZ coordinates for each marker. The XYZ coordinates of 3 or more markers are used to calculate a plate, or rigid body which is tracked over time to calculate center of gravity, XYZ position, and rotation information in the roll, pitch and yaw axes of the moveable scanning device 304.

In one embodiment, the center of gravity of the rigid body is computed by taking the average XYZ position of the 3 markers. The rotation values from one position frame to the next are computed by comparing the rigid body's center of gravity XYZ position in the current frame relative to the origin of the position capture coordinate system. Using Euler's matrices to perform elemental rotations the roll, pitch and yaw can be computed as follows.

$$R_x(\alpha)\begin{bmatrix}\Delta x\\0\\0\end{bmatrix}=\begin{bmatrix}1&0&0\\0&\cos(\alpha)&-\sin(\alpha)\\0&\sin(\alpha)&\cos(\alpha)\end{bmatrix}\begin{bmatrix}\Delta x\\0\\0\end{bmatrix}$$

$$R_y(\beta)\begin{bmatrix}0\\\Delta y\\0\end{bmatrix}=\begin{bmatrix}\cos(\beta)&0&\sin(\beta)\\0&1&0\\-\sin(\beta)&0&\cos(\beta)\end{bmatrix}\begin{bmatrix}0\\\Delta y\\0\end{bmatrix}$$

$$R_z(\gamma)\begin{bmatrix}0\\0\\\Delta z\end{bmatrix}=\begin{bmatrix}\cos(\gamma)&-\sin(\gamma)&0\\\sin(\gamma)&\cos(\gamma)&0\\0&0&1\end{bmatrix}\begin{bmatrix}0\\0\\\Delta z\end{bmatrix}$$

In one embodiment, the frame rate of the 3D position and rotation information is synchronized with the radar data in that at time t where the radar data is collected, the position sensor also captures the 3D position and rotation of scanning device 304. Thereafter, the synchronized radar data and motion data are processed to implement the backprojection imaging operations discussed above. In particular, the radar data accumulated at one moment in time is processed with motion information of the scanning device 304 at the same moment in time. In addition, oversampling of the positioning allows for filtering techniques to be employed for noise rejection and position accuracy improvement.

The reconstruction of the image uses information of the position of the transmit (Tx) and receive (Rx) antennas at each aperture sample location. The scanning device 304 may be tracked using multiple rigidly attached optical reflective markers (e.g., spheres) and the locations of the Tx and Rx antennas are derived from the motion of the markers in the following manner. The locations of all of the Tx and Rx antennas are defined mathematically in a reference position, as are the positions of the markers. The device 304, markers, and antenna array are assumed to form a rigid body, therefore the positions of the antennas at any measurement frame can be determined using a coordinate transformation that includes both 3-D rotation and translation.

In one embodiment, the position capture system returns the positions of the markers at a fixed repetition rate after commencement of the data collection. In one embodiment, the coordinate transformation between the reference pose and a measurement frame is determined using a 3D rigid body transformation estimation process described in D. W. Eggert, et al., "Estimating 3-D rigid body transformations: a comparison of four major algorithms," *Machine Vision and Applications*, vol. 9, no. 5-6, pp. 272-290, 1997, the teachings of which are incorporated by reference herein.

This process determines a 3-D rotation matrix R and translation vector t that minimizes the least-squares position error between the measured marker positions and the transformed reference marker positions. After estimation the antenna locations at each time sample can be calculated as $x_T = R x_T^{reference} + t$ where $x_T = \bar{r}_T$ is the Tx antenna location at the new position and $x_T^{reference} = \bar{r}_T$ at the reference position. The receive antenna locations are similarly calculated as $x_R = R x_R^{reference} + t$ where $x_R = \bar{r}_R$ is the Rx antenna at the new position and $x_R^{reference} = \bar{r}_R$ at the reference position. Image reconstruction is accomplished by evaluating Equation 13 over a full 3D set of image voxels using transmit and receive antenna locations that are calculated using these coordinate transformations estimated from the marker positions of the moving device 304.

Referring to FIG. 18, the moveable scanning device implemented as an unmanned aerial vehicle (UAV) 358 in shown according to one embodiment. The described example UAV 358 is configured for close-range high-resolution 3D microwave or millimeter-wave imaging for both down and side looking applications. The use of high frequency wideband radars and precision position capture systems enable penetration of emitted electromagnetic energy through barriers including non-conductive materials, soils, construction materials, clothing, etc. and the coherent formation of high-resolution 3D microwave or millimeter-wave images. More specifically, the described embodiment enables autonomous high-resolution 3D microwave or millimeter-wave imaging in and through interior building walls, autonomous ground penetrating radar, remote bridge inspection and other 3D through barrier imaging where it is logistically challenging or dangerous for human operators to be present.

In the illustrated embodiment, the UAV 358 includes a plurality of markers 360 which are coupled with a support structure 361, such as a frame, of UAV 358. During scanning operations, the markers 360 are imaged by cameras (not shown) of the position capture system 306 which are external of the UAV 358 to generate position information regarding locations and rotations of the UAV 358 within an area of interest over time. Although only one downward pointing antenna array 328 is shown in the depicted UAV 358, other embodiments may include an antenna array positioned and configured for other imaging perspectives including side-looking and overhead scanning.

In another embodiment, one or more components of the position capture system 306 such as one or more cameras 362 may be coupled with the support structure 361 and generated image data therefrom may be communicated using circuitry 324 to position capture system 306 for use in generating position information regarding locations and rotations of the UAV 358 during radar scanning in an area of interest.

The illustrated UAV 358 is configured to provide close range and high resolution imaging of targets where close range is defined as an optical F number of <10, where F number is =(target distance)/(aperture size) and high resolution equates to $N*(\lambda_c/2)$ half-power (3 dB) lateral imaging resolution where N is the optical F number, and a down-range half-power (3 dB) resolution of $2*(B/c)$, where B is the radio frequency (RF) bandwidth of the radar and c is the speed of light.

As described above, the radar data is processed using an advanced generalized synthetic aperture focusing technique (GSAFT) phase history correction and interpolation to correct for the time varying position of the UAV 358.

Different position or motion capture systems which may be utilized in some embodiments of the disclosure are described above. However, these examples are not limiting and any suitable system for providing position information during movement of the target or antenna array may be utilized to focus the captured radar data in other embodiments.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. An imaging system comprising:
  a moveable scanning device configured to move within an area of interest, the moveable scanning device comprising:
    a support structure; and
    a radar system coupled with the support structure, and wherein the radar system is configured to emit electromagnetic energy towards a target, to receive electromagnetic energy reflected from the target during movement of the moveable scanning device, and to output radar data indicative of the received electromagnetic energy;
  a position capture system configured to generate position information regarding locations of the moveable scanning device within the area of interest during the emission and reception of the electromagnetic energy;
  processing circuitry configured to process the position information and the radar data to generate image data regarding the target;
  wherein the position information and the radar data are synchronized in time with respect to one another during the processing by the processing circuitry;
  wherein the moveable scanning device comprises a plurality of markers; and
  wherein the position capture system is configured to:
    track positions of the markers to provide XYZ coordinates for each of the markers at different moments in time;
    use the XYZ coordinates for each of the markers to calculate a rigid body at the different moments in time; and
    track the rigid body to generate the position information regarding the locations of the movable scanning device at the different moments in time.

2. The imaging system of claim 1 wherein the position capture system is an optical position capture system comprising a plurality of cameras configured to monitor the locations of the moveable scanning device.

3. The imaging system of claim 1 wherein the radar system comprises a transceiver configured to receive signals corresponding to the received electromagnetic energy and to generate the radar data using the received signals.

4. The imaging system of claim 3 wherein the transceiver is configured to control the emission of the electromagnetic energy within a frequency range of approximately 0.1-100 GHz.

5. The imaging system of claim 1 wherein the radar data is indicative of intensities of the electromagnetic energy received by the radar system for a plurality of voxels.

6. The imaging system of claim 1 wherein the moveable scanning device comprises at least one motor coupled with the support structure and configured to provide the movement of the moveable scanning device within the area of interest.

7. The imaging system of claim 1 wherein the processing circuitry is located remotely from the moveable scanning device.

8. The imaging system of claim 7 wherein the moveable scanning device comprises communication circuitry configured to communicate the radar data from the moveable scanning device to the processing circuitry.

9. The imaging system of claim 1 wherein at least one component of the position capture system is coupled with the support structure of the moveable scanning device.

10. The imaging system of claim 1 wherein the radar system is configured to emit electromagnetic energy comprising a sweep of a plurality of different frequencies of a bandwidth.

11. The imaging system of claim 1 wherein the moveable scanning device is configured to be held and moved by a user during scanning of the target.

12. The imaging system of claim 1 wherein the radar system comprises a plurality of transmit antennas arranged in a first row and a plurality of receive antennas arranged in a second row, and wherein the transmit antennas and the receive antennas are staggered with respect to one another.

13. An imaging system comprising:
  a moveable scanning device configured to move within an area of interest, the moveable scanning device comprising:
    a support structure; and
    a radar system coupled with the support structure, and wherein the radar system is configured to emit electromagnetic energy towards a target, to receive electromagnetic energy reflected from the target during movement of the moveable scanning device, and to output radar data indicative of the received electromagnetic energy;
  a position capture system configured to generate position information regarding locations of the moveable scanning device within the area of interest during the emission and reception of the electromagnetic energy;
  processing circuitry configured to process the position information and the radar data to generate image data regarding the target;
  wherein the moveable scanning device comprises at least one motor coupled with the support structure and configured to provide the movement of the moveable scanning device;
  wherein the moveable scanning device comprises a plurality of markers; and
  wherein the position capture system is configured to:
    track positions of the markers to provide XYZ coordinates for each of the markers at different moments in time;
    use the XYZ coordinates for each of the markers to calculate a rigid body at the different moments in time; and track the rigid body to generate the position information regarding the locations of the movable scanning device at the different moments in time.

14. An imaging system comprising:
a moveable scanning device configured to move within an area of interest, the moveable scanning device comprising:
  a support structure; and
  a radar system coupled with the support structure, and wherein the radar system is configured to emit electromagnetic energy towards a target, to receive electromagnetic energy reflected from the target during movement of the moveable scanning device, and to output radar data indicative of the received electromagnetic energy;
a position capture system configured to generate position information regarding locations of the moveable scanning device within the area of interest during the emission and reception of the electromagnetic energy;
processing circuitry configured to process the position information and the radar data to generate image data regarding the target;
wherein the radar system comprises a plurality of transmit antennas arranged in a first row and a plurality of receive antennas arranged in a second row;
wherein the moveable scanning device comprises a plurality of markers; and
wherein the position capture system is configured to:
  track positions of the markers to provide XYZ coordinates for each of the markers at different moments in time;
  use the XYZ coordinates for each of the markers to calculate a rigid body at the different moments in time; and
  track the rigid body to generate the position information regarding the locations of the movable scanning device at the different moments in time.

15. The imaging system of claim 14 wherein the first and second rows are arranged along respective axes that are at least substantially parallel to one another and extend in directions that are at least substantially orthogonal to a direction of movement of the moveable scanning device.

16. The imaging system of claim 14 wherein the moveable scanning device comprises at least one motor coupled with the support structure and configured to provide the movement of the moveable scanning device.

17. The imaging system of claim 14 wherein the moveable scanning device is configured to be held and moved by a user during scanning of the target.

18. The imaging system of claim 1 further comprising a display configured to use the image data to generate images regarding the target.

19. The imaging system of claim 13 further comprising a display configured to use the image data to generate images regarding the target.

20. The imaging system of claim 14 further comprising a display configured to use the image data to generate images regarding the target.

21. The imaging system of claim 6 wherein the at least one motor is configured to provide the movement of the moveable scanning device between a plurality of different the locations in space within the area of interest.

22. The imaging system of claim 13 wherein the at least one motor is configured to provide the movement of the moveable scanning device between the locations in space.

23. The imaging system of claim 16 wherein the at least one motor is configured to provide the movement of the moveable scanning device between the locations in space.

* * * * *